(12) United States Patent  
Yamamoto

(10) Patent No.: US 6,658,950 B2
(45) Date of Patent: Dec. 9, 2003

(54) SHIFT CONTROL DEVICE FOR A TRANSMISSION

(75) Inventor: Yasushi Yamamoto, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/983,834

(22) Filed: Oct. 26, 2001

(65) Prior Publication Data

US 2002/0053248 A1 May 9, 2002

(30) Foreign Application Priority Data

Nov. 9, 2000 (JP) ..................... 2000-342222

(51) Int. Cl.[7] ............................................. F16H 61/32
(52) U.S. Cl. ................................ 74/336 R; 74/339
(58) Field of Search ............................ 74/335, 336 R, 74/339, 473.12

(56) References Cited

U.S. PATENT DOCUMENTS

| | | | | |
|---|---|---|---|---|
| 4,576,265 A | * | 3/1986 | Kumura et al. | 477/95 |
| 4,603,596 A | | 8/1986 | Akashi et al. | |
| 5,688,207 A | * | 11/1997 | Uchida et al. | 477/155 |
| 5,832,777 A | * | 11/1998 | Weilant | 74/335 |
| 5,910,068 A | | 6/1999 | Krauss et al. | |
| 6,164,149 A | * | 12/2000 | Ohmori et al. | 74/336 R |
| 6,227,063 B1 | * | 5/2001 | Ohmori et al. | 74/335 |
| 6,276,224 B1 | * | 8/2001 | Ueda et al. | 74/335 |
| 6,470,765 B1 | * | 10/2002 | Fukuda | 74/336 R |

FOREIGN PATENT DOCUMENTS

| | | |
|---|---|---|
| EP | 0310387 | 4/1989 |
| EP | 0354493 | 2/1990 |
| EP | 0477564 | 4/1992 |
| EP | 0933564 | 8/1999 |
| EP | 0976955 | 2/2000 |
| GB | 2338761 | 12/1999 |

* cited by examiner

Primary Examiner—Ankur Parekh
(74) Attorney, Agent, or Firm—Antonelli, Terry, Stout & Kraus, LLP

(57) ABSTRACT

A shift control device for a transmission having a synchronizing device, a select actuator for actuating the speed change operation mechanism of the transmission in the selecting direction, a shift actuator for actuating the speed change operation mechanism in the shifting direction. A controller determines the driving force of the shift actuator correspondingly to the shift stroke position. Further, the difference in the synchronizing rotational speed is determined based on the input shaft rotational speed, the gear ratio of the speed change gear that is to be engaged and the output shaft rotational speed, and the driving force of the shift actuator in a synchronizing range during the gear-engaging operation is determined based on the above determined difference in the synchronizing rotational speed.

5 Claims, 14 Drawing Sheets

SHIFT CONTROL DEVICE FOR A TRANSMISSION

FIELD OF THE INVENTION

The present invention relates to a shift control device for a transmission mounted on a vehicle and, particularly, to a shift control device for a transmission equipped with a synchronizing device.

DESCRIPTION OF THE PRIOR ART

There has been put into practical use a transmission which is equipped with a select actuator for actuating a speed-changing mechanism for changing the speed of the transmission in the selecting direction and a shift actuator for actuating the speed-changing mechanism in the shifting direction, the select actuator and the shift actuator being controlled in response to a speed-change instruction from a target gear position instruction means that instructs a target gear position of the transmission.

As the select actuator and the shift actuator, there have generally been used fluid pressure cylinders using a fluid pressure such as pneumatic pressure or hydraulic pressure as a source of operation. In recent years, further, a select actuator and a shift actuator constituted by electric motors have been proposed for use in a transmission mounted on a vehicle which is provided with neither a source of the compressed air nor a source of the hydraulic pressure.

In shifting the transmission equipped with a synchronizing device, the largest operation force is required for the synchronizing operation in the gear-engaging operation, and the next largest force is required for engaging the chamfer of dog teeth with the chamfer of the spline of the clutch sleeve. In the gear-disengaging operation, further, the operation force is required from the start of the gear-disengaging operation until the dog teeth are disengaged from the spline of the clutch sleeve. Therefore, the shift actuator is designed to be operated with a driving force that is set in advance correspondingly to the shift stroke position.

During the gear-engaging operation, the required shift operation force in the synchronizing range varies depending upon the difference in the synchronizing rotational speed, which is a difference between the rotational speed of the output shaft at the start of synchronization, i.e., the rotational speed of the synchronizing side (clutch sleeve), and the rotational speed of the to-be-synchronized side (speed change gear that is to be engaged). Namely, the shift operation force may be decreased with a decrease in the difference in the synchronizing rotational speed, and may be increased with an increase in the difference in the synchronizing rotational speed. In a transmission in which the driving force of the shift actuator is controlled correspondingly to the shift stroke position, however, the driving force of the shift actuator in the synchronizing range has been set to a predetermined value. Therefore, the synchronizing time increases with an increase in the difference in the synchronizing rotational speed and decreases with a decrease in the difference in the synchronizing rotational speed. In a transmission in which the driving force of the shift actuator is controlled correspondingly to the shift stroke position as described above, the speed changing time required from when the driver has instructed to change the speed until the speed changing operation is finished, varies depending upon the difference in the synchronizing rotational speed. Hence, this is not desirable from the standpoint of feeling of the driver in changing the speed.

During the synchronizing operation, further, the stirring resistance that is produced at the time the counter gears in mesh with the speed change gears stir the lubricating oil acts in opposite directions depending upon whether the shifting is a shift-up or a the shift-down. That is, the stirring resistance advantageously acts on the synchronizing operation at the time of shift-up but disadvantageously acts on the synchronizing operation at the time of shift-down. It is therefore desired that the shift operation force in the synchronizing range at the time of shift-down be set to be larger than that at the time of shift-up even when the difference in the synchronizing rotational speed is the same.

Besides, even when the difference in the synchronizing rotational speed is the same, the synchronizing action needs an increased force with an increase in the gear ratio of the speed change gear. It is therefore desired that the shift operation force be set for each of the gear positions.

SUMMARY OF THE INVENTION

An object of the present invention is to provide a shift control device for a transmission, which is capable of always making nearly uniform the speed changing time required from when the change of speed is instructed until the speed changing operation is finished.

In order to accomplish the above-mentioned object, the present invention provides a shift control device for a transmission, comprising a transmission equipped with a synchronizing device, a speed change operation mechanism for changing the speed of said transmission, a select actuator for actuating said speed change operation mechanism in the selecting direction, and a shift actuator for actuating said speed change operation mechanism in the shifting direction, said shift control device for a transmission further comprising:

a target gear position instruction means for instructing a target gear position of said transmission;

a shift stroke sensor for detecting a shift stroke position of said speed change operation mechanism;

an input shaft rotational speed sensor for detecting the rotational speed of the input shaft of said transmission;

an output shaft rotational speed sensor for detecting the rotational speed of the output shaft of said transmission; and a controller for controlling said select actuator and said shift actuator based on the signals from said target gear position instruction means, said shift stroke sensor, said input shaft rotational speed sensor and said output shaft rotational speed sensor; wherein, said controller determines the driving force of said shift actuator that corresponds to the shift stroke position based on the signals from said target gear position instruction means, said shift stroke sensor, said input shaft rotational speed sensor and said output shaft rotational speed sensor, determines the difference in the synchronizing rotational speed based on the input shaft rotational speed, the gear ratio of the target gear position and the output shaft rotational speed, and determines the driving force of said shift actuator in the synchronizing range based on said determined difference in the synchronizing rotational speed.

It is desired that the driving force of the shift actuator in said synchronizing range be obtained based on the determined difference in the synchronizing rotational speed and the gear ratio of the target gear position. The shift actuator is an electric motor, and the controller determines the driving electric power of the shift actuator in the synchronizing range.

The present invention further provides a shift control device for a transmission, comprising a transmission equipped with a synchronizing device, a speed change operation mechanism for changing the speed of said transmission, a select actuator for actuating said speed change operation mechanism in the selecting direction, and a shift actuator for actuating said speed change operation mechanism in the shifting direction, said shift control device for a transmission further comprising:

a target gear position instruction means for instructing a target gear position of said transmission;

a shift stroke sensor for detecting a shift stroke position of said speed change operation mechanism;

an input shaft rotational speed sensor for detecting the rotational speed of the input shaft of said transmission;

an output shaft rotational speed sensor for detecting the rotational speed of the output shaft of said transmission; and a controller for controlling said select actuator and said shift actuator based on the signals from said target gear position instruction means, said shift stroke sensor, said input shaft rotational speed sensor and said output shaft rotational speed sensor; wherein, said controller is provided with a map of the driving force in a synchronizing range, in which the driving force is set to correspond to the difference in the synchronizing rotational speed, and determines the driving force of said shift actuator, which corresponds to the shift stroke position based on the signals from said target gear position instruction means, said shift stroke sensor, said input shaft rotational speed sensor and said output shaft rotational speed sensor, determines the difference in the synchronizing rotational speed based on the input shaft rotational speed, the gear ratio of the target gear position and the output shaft rotational speed, and determines the driving force of said shift actuator in the synchronizing range, which corresponds to the determined difference in the synchronizing rotational speed from said map of the driving force.

The shift actuator is an electric motor, the map of the driving force is a map of the driving electric power, and the controller determines the driving electric power of the shift actuator in the synchronizing range from the map of the driving force.

The present invention further provides a shift control device for a transmission, comprising a transmission equipped with a synchronizing device, a speed change operation mechanism for changing the speed of said transmission, a select actuator for actuating said speed change operation mechanism in the selecting direction, and a shift actuator for actuating said speed change operation mechanism in the shifting direction, said shift control device for a transmission further comprising:

a target gear position instruction means for instructing a target gear position of said transmission;

a shift stroke sensor for detecting the shift stroke position of said speed change operation mechanism;

an input shaft rotational speed sensor for detecting the rotational speed of the input shaft of said transmission;

an output shaft rotational speed sensor for detecting the rotational speed of the output shaft of said transmission; and a controller for controlling said select actuator and said shift actuator based on the signals from said target gear position instruction means, said shift stroke sensor, said input shaft rotational speed sensor and said output shaft rotational speed sensor; wherein, said controller is provided with a map of the driving force for shift-up in a synchronizing range, in which the driving force at the time of shift-up is set to correspond to the difference in the synchronizing rotational speed, a map of the driving force for shift-down in the synchronizing range, in which the driving force at the time of shift-down is set to correspond to the difference in the synchronizing rotational speed, and a shift-up/shift-down judging means for judging whether the target gear position instructed by said target gear position instruction means is for shift-up or for shift-down, and determines the driving force of said shift actuator that corresponds to the shift stroke position based on the signals from said target gear position instruction means, said shift stroke sensor, said input shaft rotational speed sensor and said output shaft rotational speed sensor, selects said map of the driving electric power for shift-up or said map of the driving electric power for shift-down based on the judgment of said shift-up/shift-down judging means, determines the difference in the synchronizing rotational speed based on the input shaft rotational speed, the gear ratio of the target gear position and the output shaft rotational speed, and determines the driving electric power of said shift actuator in the synchronizing range that corresponds to the determined difference in the synchronizing rotational speed from the selected map of the driving force.

The shift actuator is an electric motor, the map of the driving force for shift-up and the map of the driving force for shift-down are respectively a map of the driving electric power for shift-up and a map of the driving electric power for shift-down, and the controller determines the driving electric power of said shift actuator in the synchronizing range from the map of the driving electric power for shift-up and from the map of the driving electric power for shift-down.

The present invention further provides a shift control device for a transmission, comprising a transmission equipped with a synchronizing device, a speed change operation mechanism for changing the speed of said transmission, a select actuator for actuating said speed change operation mechanism in the selecting direction, and a shift actuator for actuating said speed change operation mechanism in the shifting direction, said shift control device for a transmission further comprising:

a target gear position instruction means for instructing a target gear position of said transmission;

a shift stroke sensor for detecting a shift stroke position of said speed change operation mechanism;

an input shaft rotational speed sensor for detecting the rotational speed of the input shaft of said transmission;

an output shaft rotational speed sensor for detecting the rotational speed of the output shaft of said transmission; and a controller for controlling said select actuator and said shift actuator based on the signals from said target gear position instruction means, said shift stroke sensor, said input shaft rotational speed sensor and said output shaft rotational speed sensor; wherein, said controller is provided with a map of the driving force in a range, in which a driving force is set to correspond to the difference in the synchronizing rotational speed for each of the gear positions of said transmission, and determines the driving force of said shift actuator that corresponds to the shift stroke position based on the signals from said target gear position instruction means, said shift stroke sensor, said input shaft rotational speed sensor and said output shaft rotational speed sensor, determines the difference in the synchronizing rotational speed based on the input shaft rotational speed, the gear ratio of the target gear position and the output shaft rotational speed, and determines the driving force of said shift actuator in the synchronizing range, that corresponds to the determined difference in the synchronizing rotational speed from the map of the driving force corresponding to the target gear position.

It is desired that the map of the driving force include a map of the driving force for shift-up and a map of the driving force for shift-down for the intermediate speed change gears and that said controller be provided with a shift-up/shift-down judging means for judging whether a to-be-engaged speed change gear detected by said to-be-engaged gear detecting means is to be shifted-up or to be shifted-down, and select said map of the driving force for shift-up or said map of the driving force for shift-down based on the judgment of said shift-up/shift-down judging means when the to-be-engaged speed change gear is an intermediate gear, determines the difference in the synchronizing rotational speed based on the input shaft rotational speed, the gear ratio of the to-be-engaged speed change gear and the output shaft rotational speed, and determines the driving force of said shift actuator in the synchronizing range that corresponds to the determined difference in the synchronizing rotational speed from the elected map of the driving force.

The shift actuator is an electric motor, the map of the driving force is a map of the driving electric power, and the controller determines the driving electric power of the shift actuator in the synchronizing range from the map of the driving electric power.

DETAILED DESCRIPTION OF THE PREFERRED EMBODIMENTS

Preferred embodiments of the shift control device for a transmission constituted according to the present invention will now be described in further detail with reference to the accompanying drawings.

Figure 1:
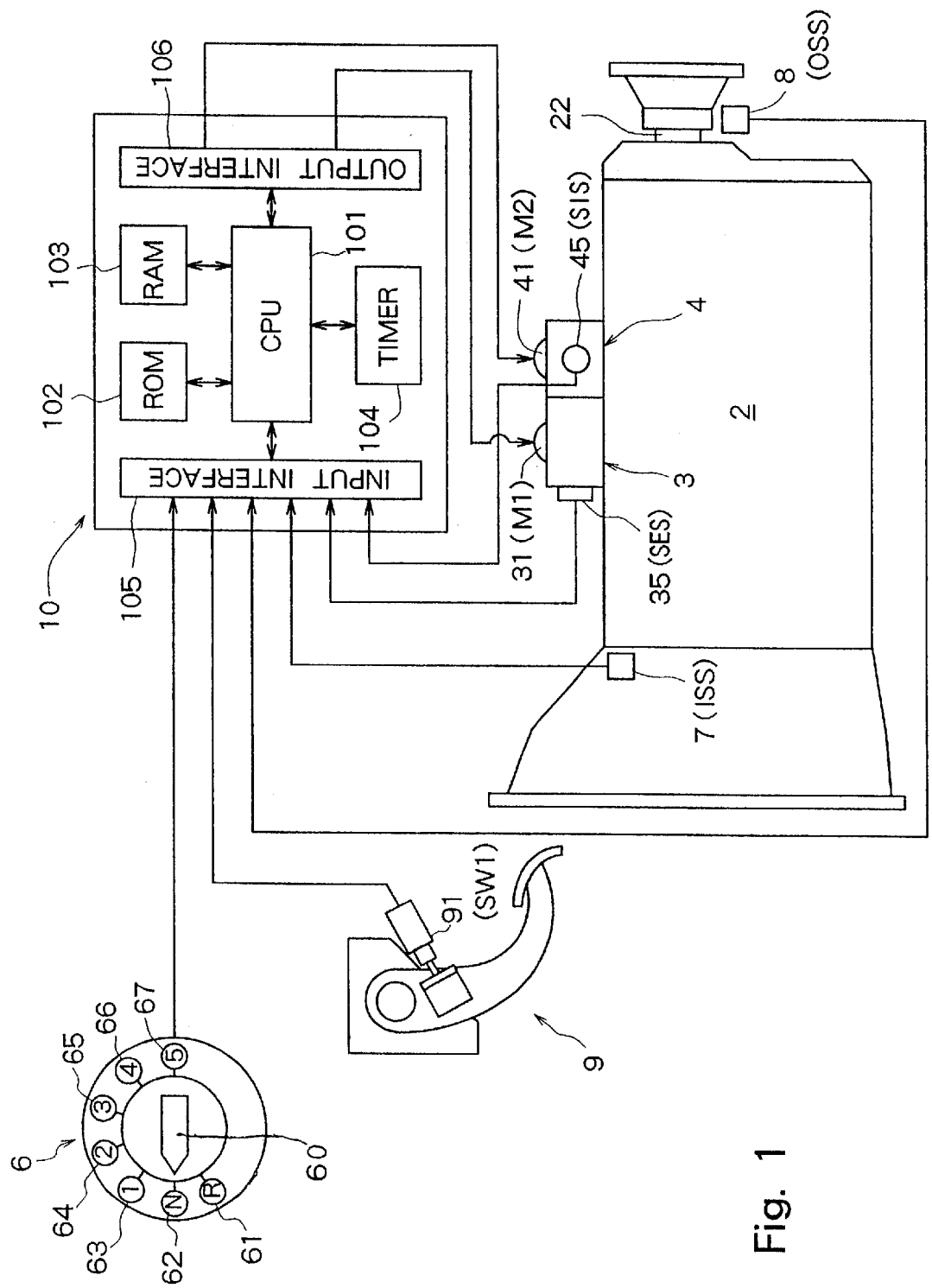
FIG. 1 is a diagram schematically illustrating the constitution of a shift control of a transmission constituted according to the present invention.

FIG. 1 is a diagram schematically illustrating the constitution of a shift control device for a transmission constituted according to the present invention.

In FIG. 1, reference numeral 2 denotes a transmission equipped with a synchronizing device. The transmission is operated to change the speed by a select actuator 3 that actuates the speed-changing mechanism in the selecting direction and by a shift actuator 4 that actuates the speed-changing mechanism in the shifting direction, that will be described later.

Figure 2:
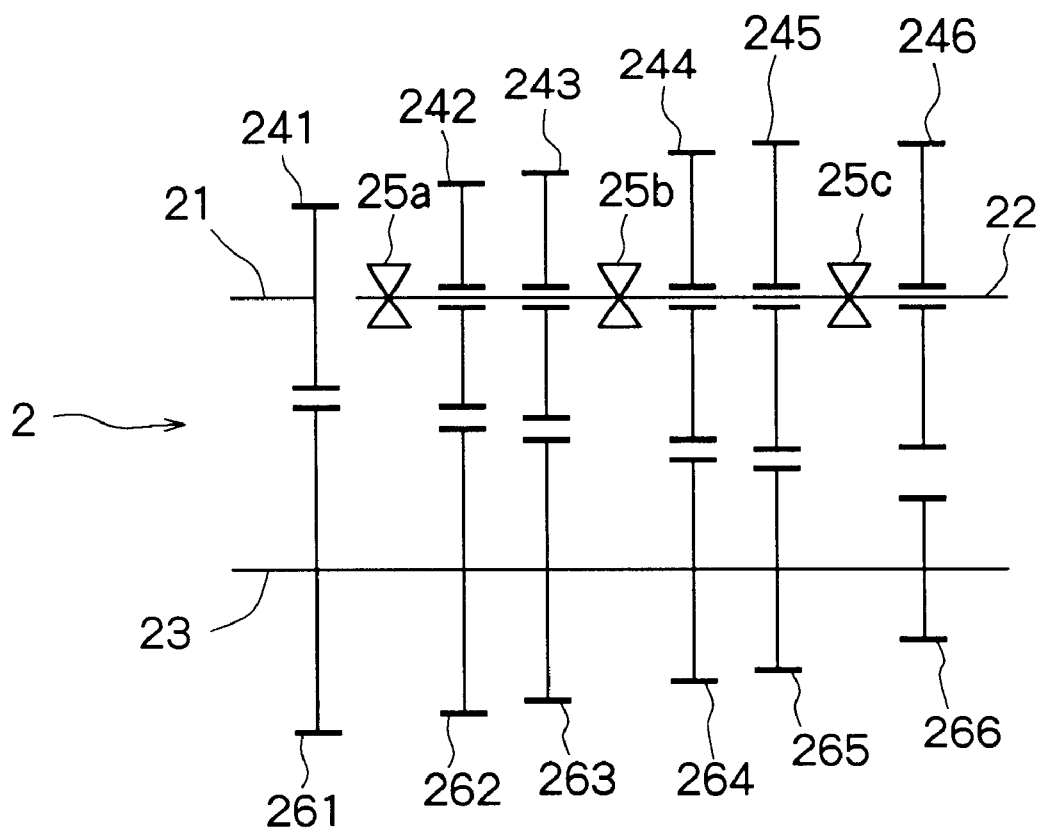
FIG. 2 is a diagram schematically illustrating the constitution of a gear mechanism in the transmission of FIG. 1.

Referring to FIG. 2, the transmission 2 includes a gear mechanism of five forward positions and one reverse position. The transmission 2 includes an input shaft 21, an output shaft 22 disposed on the same axis as that of the input shaft 21, and a counter shaft 23 arranged in parallel with the output shaft 22. On the input shaft 21 is rotatably mounted a drive gear 241 (a fifth speed gear in the illustrated embodiment), and on the output shaft 22 are mounted a fourth speed gear 242, a third speed gear 243, a second speed gear 244, a first speed gear 245 and a reverse gear 246. On the output shaft 22 are further disposed synchronizing devices 25a, 25b and 25c between the fifth speed gear 241 and the fourth speed gear 242, between the third speed gear 243 and the second speed gear 244, and between the first speed gear 245 and the reverse gear 246. On the counter shaft 23, there are arranged counter gears 261, 262, 263, 264 and 265 that are in mesh with the fifth speed gear 241, fourth speed gear 242, third speed gear 243, second speed gear 244 and first speed gear 245 at all times, as well as a counter gear 266 that is in mesh with the reverse gear 246 via an idling gear that is not shown.

Figure 3:
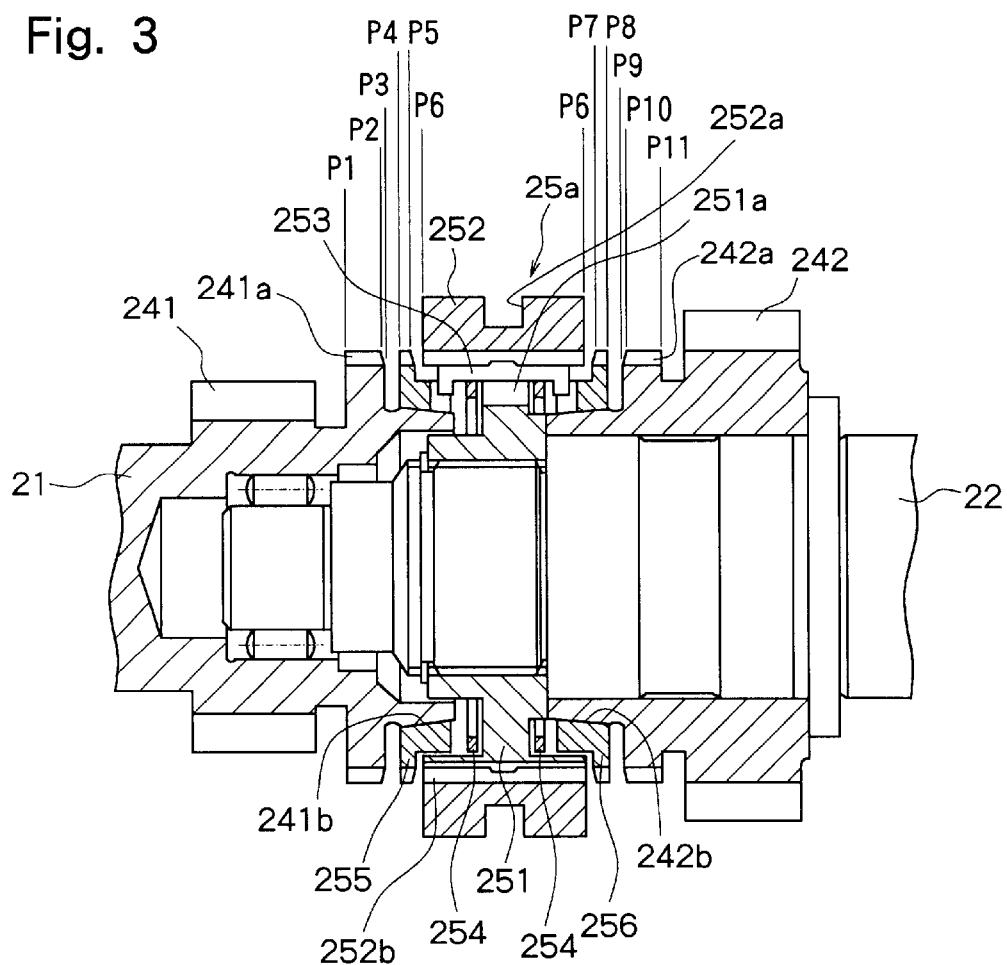
FIG. 3 is a sectional view of a synchronizing device with which the transmission of FIG. 2 is provided.

Next, the synchronizing devices 25a, 25b and 25c will be described with reference to FIG. 3. The illustrated synchronizing devices 25a, 25b and 25c are all constituted substantially in the same manner. Therefore, described below is the synchronizing device 25a only that is disposed between the fifth speed gear 241 and the fourth speed gear 242.

The illustrated synchronizing device 25a is a known key-type synchronizing device which comprises a clutch hub 251 mounted on the output shaft 22, a clutch sleeve 252 slidably fitted to an external gear spline formed on the outer circumference of the clutch hub 251, keys 253 arranged in plural (e.g., three) key grooves 251a formed in the clutch hub 251 in the radial direction thereof, key springs 254, 254 arranged on the inner sides at both ends of the keys 253 to push the keys 253 toward the clutch sleeve 252, dog teeth 241a and 242a formed on the fifth speed gear 241 and on the fourth speed gear 242, and synchronizer rings 255 and 256 disposed on the conical surfaces 241b and 242b formed on the fifth speed gear 241 and on the fourth speed gear 242. The thus constituted synchronizing device 25a has a shift fork fitted into an annular groove 252a formed in the outer circumference of the clutch sleeve 252, the shift fork being mounted on a shift rod of a shifting mechanism that constitutes the speed change operation mechanism 5 as will be described later. The clutch sleeve 252 is slid by the shift fork toward either the right or the left in the drawing, whereby the spline 252b of the clutch sleeve 252 is brought into mesh with the teeth of the synchronizer ring 255 and dog teeth 241a or with the synchronizer ring 256 and dog teeth 242a. The illustrated synchronizing device has been constituted in a known manner and is not described here in further detail.

The above-mentioned synchronizing devices 25a, 25b and 25c are operated by the speed change operation mechanism 5 shown in FIG. 4, actuated by the select actuator 3 and the shift actuator 4 that will be described later.

Figure 4:
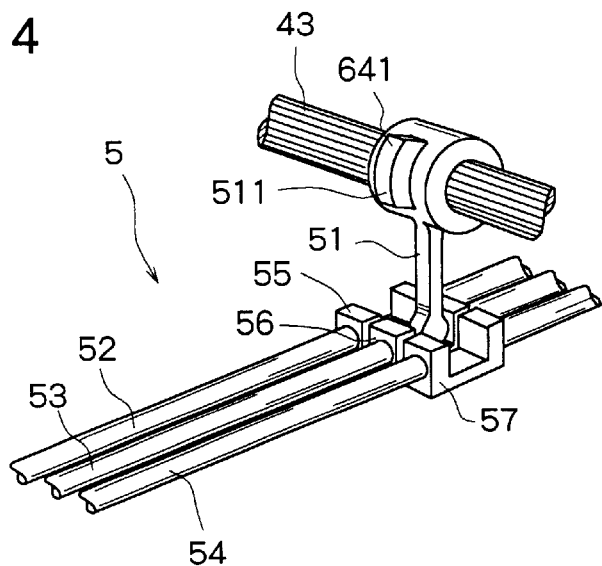
FIG. 4 is a perspective view illustrating major portions of a speed change operation mechanism constituting the speed-changing mechanism shown in FIG. 1.

Next, described below with reference to FIG. 4 is the speed change operation mechanism 5 for operating the above mentioned synchronizing devices 25a, 25b and 25c.

The speed change operation mechanism 5, according to the illustrated embodiment, is constituted by a shift lever 51, and three shift rods 52, 53 and 54. The shift lever 51 is spline-fitted to a control shaft 43 of the shift actuator 4 that will be described later, so as to slide in the axial direction. The shift lever 51 selectively engages at its end with a shift block 55, 56 or 57 mounted on the shift rods 52, 53 and 54. The shift lever 51 is provided on the side surface thereof with an engaging protuberance 511 that engages with a select block that will be described later. Shift forks (not shown) are mounted on the shift rods 52, 53 and 54, and engage with the annular grooves 252a formed in the outer circumferences of the clutch sleeves of the synchronizing devices 25a, 25b and 25c. Known interlocking mechanisms are arranged among the shift rods 52, 53 and 54, so that two shift rods will not operate simultaneously. The speed change operation mechanism 5 is constituted in a known manner and is not described here in further detail.

Figure 5:
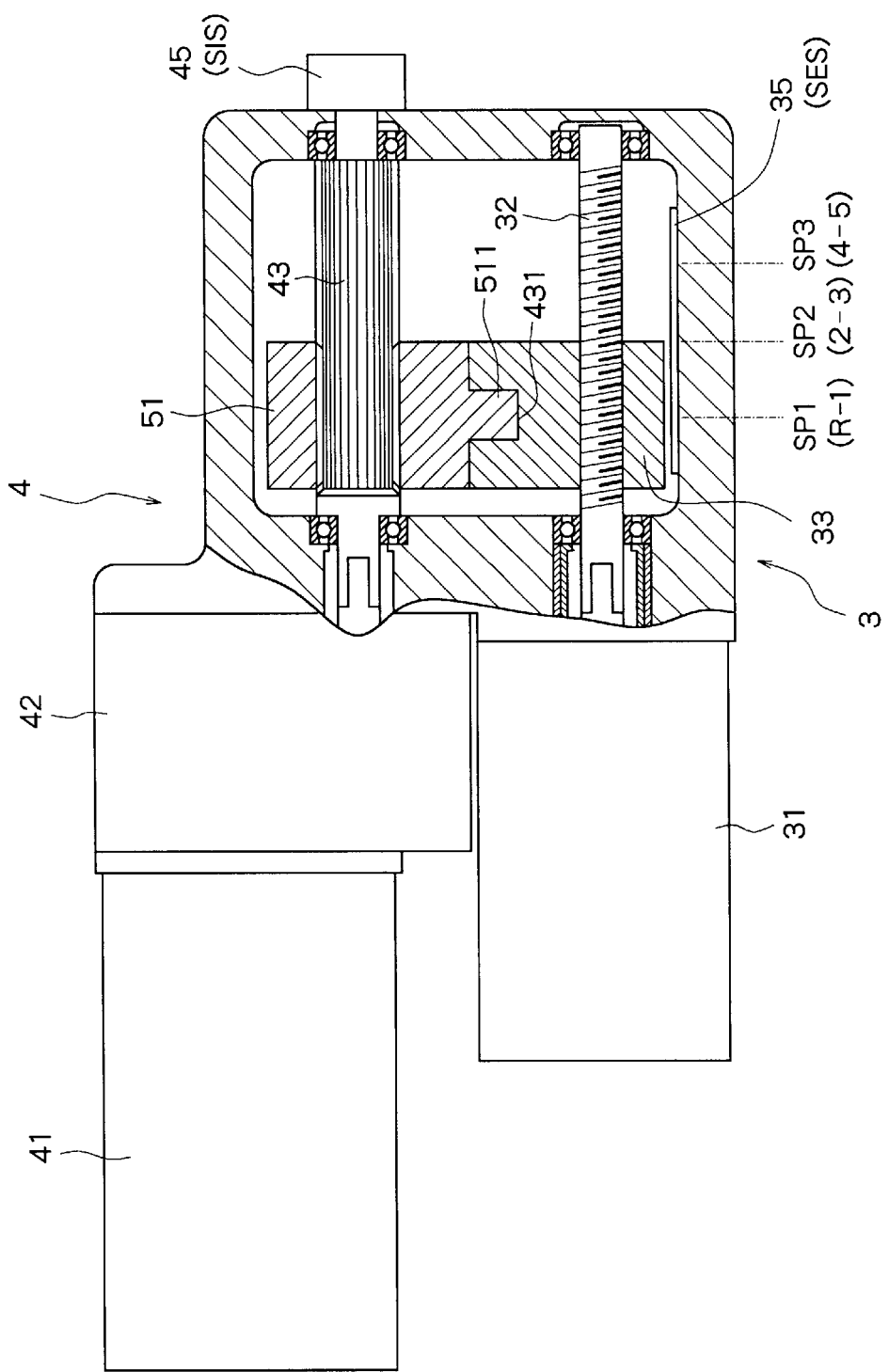
FIG. 5 is a plan view illustrating, in a cut-away manner, major portions of a select actuator and of a shift actuator for actuating the speed change operation mechanism shown in FIG. 4.

Next, described below with reference to FIG. 5 are the select actuator 3 and the shift actuator 4.

The shift actuator 4 in the illustrated embodiment includes an electric motor 41 (M2) that can be rotated forward and reverse, a reduction gear 42 drive-coupled to a drive shaft of the electric motor 41 (M2) and a control shaft 43 coupled to the output shaft of the reduction gear 42. The shift lever 51 is spline-fitted to the control shaft 43. When the electric motor 41 (M2) is driven forward, the thus constituted shift actuator 4 turns the control shaft 43 in one direction, causing the shift lever 51 to swing in one direction, thereby to move the shift rod mounting the shift block with which the shift lever 51 is engaged in one direction. When the electric motor 41 (M2) is driven reverse, on the other hand, the thus constituted shift actuator 4 turns the control shaft 43 in the other direction, causing the shift lever 51 to swing in the other direction, thereby to move the shift rod mounting the shift block with which the shift lever 51 is engaged in the other direction.

The select actuator 3 includes an electric motor 31 (M1) that can be rotated forward and reverse, an externally threaded shaft 32 drive-coupled to the electric motor 31 (M1), and a select block 33 having an internally threaded screw that engages with the externally threaded shaft 32. Referring to FIG. 5, an engaging recess 431 is formed in the side surface of the select block 33 to engage with an engaging protuberance 511 provided on the side surface of the shift lever 51. The end surface of the engaging protuberance 511 and the bottom surface of the engaging recess 431 are formed by arcuate planes having radii extending nearly equal distances from the axis of the control shaft 43. When the electric motor 31 (M1) is driven forward, the thus constituted select actuator 3 causes the externally threaded shaft 32 to rotate in one direction so that the select block 33 is actuated toward, for example, the right in FIG. 5. When the electric motor 31 (M1) is driven reverse, the externally threaded shaft 32 is rotated in the opposite direction so that the select block 33 is actuated toward, for example, the left in FIG. 5. As a result, the shift lever 51, which is engaged with the select block 33, is actuated toward the right or left in FIG. 5, and is brought to a predetermined select position SP1, SP2 or SP3.

The select actuator 3 includes a select position sensor 35 (SES) for detecting the position of the select block 33, i.e., of the shift lever 51 in the selecting direction (right-and-left direction in FIG. 5). The select position sensor 35 (SES) comprises a potentiometer that detects the position of the select block 33 in the selecting direction (right-and-left direction in FIG. 5), and sends the detection signal to a controller 10 that will be described later.

The above-mentioned shift actuator 4 includes a shift stroke sensor 45 (SIS) that detects the shift stroke position of the speed change operation mechanism 5. The shift stroke sensor 45 (SIS) in the illustrated embodiment comprises a potentiometer which is coupled to the control shaft 43 of the shift actuator 4, detects the shift stroke position from the angle of operation of the control shaft 43, and sends the detection signal to the controller 10 that will be described later.

Referring to FIG. 1, the shift control device for the transmission according to the illustrated embodiment includes a target gear position instruction means 6 for instructing a target gear position of the transmission 2. In the illustrated embodiment, the target gear position instruction means 6 is of the dial type in which a dial 60 is turned to select a reverse position 61, a neutral position 62, a first speed position 63, a second speed position 64, a third speed position 65, a fourth speed position 66 or a fifth speed position 67, and a speed-change instruction signal is sent to the controller 10 that will be described later. In the illustrated embodiment, further, the shift control device for the transmission includes an input shaft rotational speed sensor 7 (ISS), which is an input shaft rotational speed detection means for detecting the rotational speed of the input shaft 21 of the transmission 2, and an output shaft rotational speed sensor 8 (OSS), which is an output shaft rotational speed detection means for detecting the rotational speed of the output shaft 22. The input shaft rotational speed sensor 7 (ISS) and the output shaft rotational speed sensor 8 (OSS) send their detection signals to the controller 10 that will be described later.

The shift control device for the transmission according to the illustrated embodiment is further provided with a clutch pedal switch 91 (SW1) for detecting the operation condition of a clutch pedal 9 that actuates the clutch disposed between an engine that is not shown and the transmission 2. The clutch pedal switch 91 (SW1) remains turned off in a state where the clutch pedal 9 is liberated, i.e., in a state where the clutch pedal 9 is not depressed, and sends an ON signal to the controller 10 when the clutch pedal 9 is depressed in order to disconnect the clutch.

The controller 10 is constituted by a microcomputer which includes a central processing unit (CPU) 101 for executing the operation according to a control program, a read-only memory (ROM) 102 for storing the control program, the speed change ratio (gear ratio) of a speed change gear of each of gear positions of the transmission 2 and a map of the driving electric power that will be described later, a random access memory (RAM) 103 for storing the results of operation, a timer (T) 104, an input interface 105 and an output interface 106. The input interface 105 of the thus constituted controller 10 receives signals detected by the select position sensor 35 (SES), shift stroke sensor 45 (SIS), target gear position instruction means 6, input shaft rotational speed sensor 7 (ISS), output shaft rotational speed sensor 8 (SOS) and clutch pedal switch 91 (SW1). When an automatic clutch is mounted to automatically disconnect or connect the clutch based on the speed-change instruction signals from the target gear position instruction means 6, the input interface 105 receives a signal detected by a clutch stroke sensor that detects the amount of engagement of the clutch instead of the signal from the clutch pedal switch 91 (SW1). The output interface 106 sends control signals to the electric motor 31 (M1) of the select actuator 3 and to the electric motor 41 (M2) of the shift actuator 4.

Figure 6:
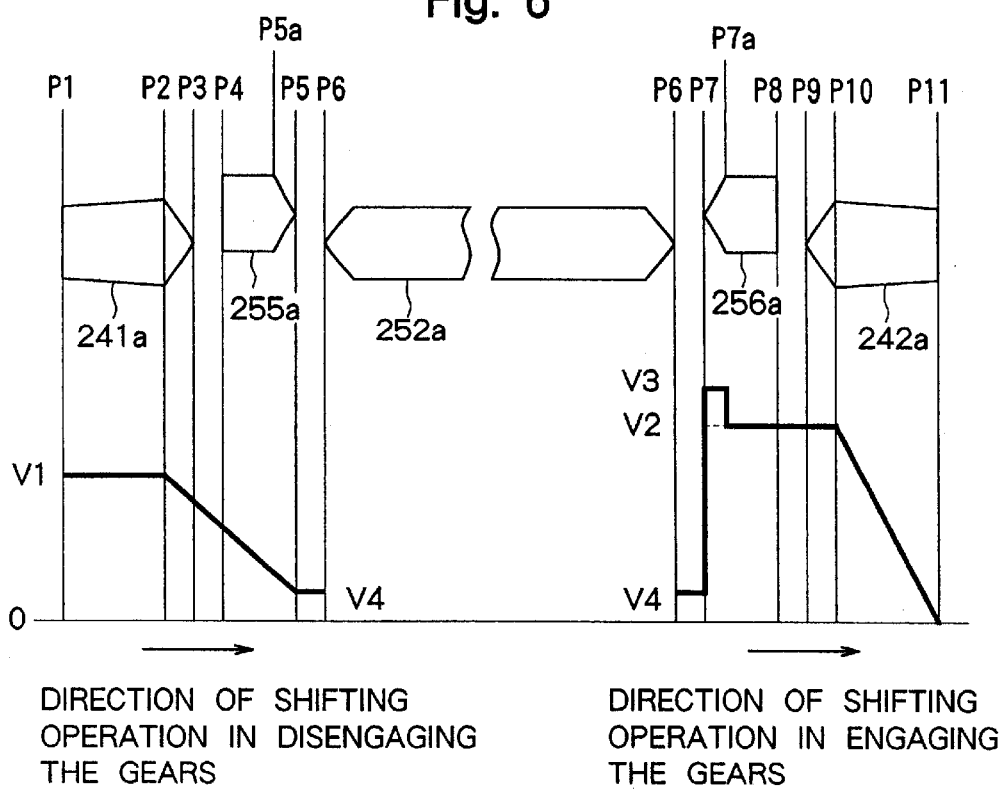
FIG. 6 is a diagram illustrating the relationship between the shift stroke positions of the clutch sleeve in the synchronizing device shown in FIG. 2 and the voltage applied to the electric motor in the shift actuator.

Next, the operation force corresponding to the shift stroke position, of the shift actuator 4 will be described with reference to FIG. 6. FIG. 6 illustrates the positional relationship among the spline 252a of the clutch sleeve 252, teeth 255a of the synchronizer ring 255 for the fifth speed gear 241 and dog teeth 241a, teeth 256a of the synchronizer ring 256 for the fourth speed gear 242 and dog teeth 242a, in their neutral state. In the embodiment shown in FIG. 6, the shift stroke position of the clutch sleeve 252 in its neutral state is designated at P6. Symbol P5 denotes a shift stroke position (at which the synchronization starts in the gear-engaging operation) of the clutch sleeve 252 as it is moved from the neutral state toward the fifth speed gear 241 side (toward the left in FIG. 6) and arrives at the front end of the chamfer of the teeth 255a of the synchronizer ring 255 for the fifth speed gear 241, P5a denotes the shift stroke position (at which the synchronization ends in the gear-engaging operation) of the clutch sleeve 252 as it arrives at the rear end of the chamfer of the teeth 255a of the synchronizer ring 255 for the fifth speed gear 241, P4 denotes the shift stroke position of the clutch sleeve 252 as it arrives at the rear end of the teeth 255a of the synchronizer ring 255, P3 denotes the shift stroke position of the clutch sleeve 252 as it arrives at the front end of the chamfer of the dog teeth 241a for the fifth speed gear 241, P2 denotes the shift stroke position (shift stroke position at which meshing with the dog teeth 241a of the clutch sleeve 252 is discontinued in the gear-disengaging operation) of the clutch sleeve 252 that arrives at the rear end of the chamfer of the dog teeth 241a, and P1 denotes the shift stroke position of the clutch sleeve 252 as it arrives at the rear end of the dog teeth 241a.

Further, symbol P7 denotes the shift stroke position (where the synchronization starts in the gear-engaging operation) of the clutch sleeve 252 as it is moved from the neutral state toward the fourth speed gear 242 side (toward the right in FIG. 6) and arrives at the front end of the chamfer of the teeth 256a of the synchronizer ring 256 for the fourth speed gear 242, P7a denotes the shift stroke position (where the synchronization ends in the gear-engaging operation) of the clutch sleeve 252 as it arrives at the rear end of the chamfer of the teeth 256a of the synchronizer ring 256 for the fourth speed gear 242, P8 denotes the shift stroke position of the clutch sleeve 252 as it arrives at the rear end of the teeth 256a of the synchronizer ring 256, P9 denotes the shift stroke position of the clutch sleeve 252 as it arrives at the front end of the chamfer of the dog teeth 242a for the fourth speed gear 242, P10 denotes the shift stroke position (shift stroke position at which the meshing with the dog-teeth 242a of the clutch sleeve 252 is discontinued in the gear-disengaging operation) of the clutch sleeve 252 as it arrives at the rear end of the chamfer of the dog teeth 242a, and P11 denotes the shift stroke position of the clutch sleeve 252 as it arrives at the rear end of the dog teeth 242a. The shift stroke positions are detected by the shift stroke sensor 45 (SIS). In the illustrated embodiment, the shift stroke sensor 45 (SIS) is so constituted as to produce a voltage signal of the smallest value when the shift stroke position is P1, to produce the output voltage that gradually increases as the shift stroke position goes toward the P11 side, and produces a voltage signal of the largest value when the shift stroke position is P11.

In shifting the clutch sleeve 252 from the neutral state shown in FIG. 6 toward either the fourth speed gear 242 or the fifth speed gear 241 (in engaging the gears), the largest operation force is required in the synchronizing range of from the shift stroke position P7 or P5, i.e., from the position at which the synchronizing action starts up to the shift stroke position P7a or P5a at which the synchronizing action ends. During the gear-engaging operation, therefore, the electric motor 41 (M2) of the shift actuator 4 may be actuated with the largest driving force. Further, during the gear-engaging operation, a relatively large operation force, though it is smaller than that in the above-mentioned synchronizing range, is required in the engaging range of from the shift stroke position P7a or P5a to the shift stroke position P10 or P2, i.e., in a range where the chamfer of the spline 252b of the clutch sleeve 252 engages with the chamfer of the dog teeth 242a or 241a. During the gear-engaging operation, therefore, it is desired to actuate the electric motor 41 (M2) of the shift actuator 4 with a relatively large driving force which is smaller than that in the synchronizing range even in the engaging period in which the dog teeth engages with the chamfer of the clutch sleeve. On the other hand, when the clutch sleeve 252 returns to the neutral state from a state of being engaged with the fourth speed gear 242 or the fifth speed gear 241, i.e., from the shift stroke position P11 or P1 (in disengaging the gears), a relatively large operation force is required during a period until the spline 252b of the clutch sleeve 252 passes through the above shift stroke position P10 or P2, i.e., passes through the rear end of the chamfer of the dog teeth. At the time of gear-disengaging operation, therefore, the electric motor 41 (M2) of the shift actuator 4 may be actuated with a relatively large driving force during the shift stroke of from the gear-engaged state until the rear end of the chamfer of the dog teeth is passed (i.e., a range in which the dog teeth are in mesh with the clutch sleeve 252).

The operation force of the shift actuator 4 in the gear-disengaging operation may be smaller than the operation force in the gear-engaging operation. The operation force is controlled by controlling the electric power (the voltage or the current) applied to the electric motor 41 (M2) of the shift actuator 4. The rotational direction in which the electric motor 41 (M2) is driven is, for example, the forward rotation when the clutch sleeve 252 is operated toward the left in FIG. 6, and is, for example, the reverse rotation when the clutch sleeve 252 is operated toward the right in FIG. 6. When, for example, the state where the gear is engaged with the fifth speed gear 241 is to be shifted down to the target fourth speed by the target gear position instruction means 6, the electric motor 41 (M2) of the shift actuator 4 is reversely driven with a voltage V1 from the shift stroke position P1 to P2, i.e., until the spline 252b of the clutch sleeve 252 passes over the rear end of the chamfer of the dog teeth 241a (during a period in which the dog teeth are in mesh with the clutch sleeve 252), as shown in FIG. 6. Then, the voltage is gradually lowered until P5 and is set to V4. When the shift stroke position P is in the neutral range (P5≦P≦P7), it is confirmed whether the select position is in agreement with the select position of the target gear position (fourth gear position this time). When they are in agreement, the electric motor 41 (M2) of the shift actuator 4 is driven with the voltage V4. When the select position is not in agreement with the select position of the target gear position (fourth gear position this time), the electric motor 41 (M2) of the shift actuator 4 is no longer driven, the select actuator 3 is actuated to bring the select position to the target gear position (fourth gear position this time) and, then, the electric motor 41 (M2) of the shift actuator 4 is driven with the voltage V4.

The electric motor 41 (M2) of the shift actuator 4 is driven with the voltage V4 from the neutral position P6 until the clutch sleeve 252 reaches the position P7 where the synchronizing action starts. When the clutch sleeve 252 arrives at P7, the electric motor 41 (M2) is reversely driven with a voltage V3 higher than the above voltage V1. In the embodiment shown in FIG. 6, the reverse rotation is maintained with the voltage V3 for a period (synchronizing period) until the spline 252b of the clutch sleeve 252 passes the shift stroke position P7a that corresponds to the rear end of the chamfer of the dog teeth 256a of the synchronizer ring 256 for the fourth speed gear 242. After the shift stroke has passed P7a, the electric motor 41 (M2) of the shift actuator 4 is reversely driven with a voltage V2 which is higher than the voltage V1 but is lower than the voltage V3. The reverse rotation is maintained with the voltage V2 for a period until the spline 252b of the clutch sleeve 252 passes the position P10 that corresponds to the rear end of the chamfer of the dog teeth 242a. The driving voltage (V2) for the period from P7a to P10 in the gear-engaging operation is set to a predetermined value. On the other hand, the driving voltage (V3) in the synchronizing period (from P7 to P7a) is set based on the difference in the synchronizing rotational speed at the start of synchronization, i.e., based on the difference between the rotational speed of the synchronizing side (clutch sleeve 252) and the rotational speed of the to-be-synchronized side (speed change gear that is to be engaged) as described later.

As described above, when the clutch sleeve 252 passes over P10, the voltage applied to the electric motor 41 (M2) of the shift actuator 4 is gradually lowered and the electric motor 41 (M2) is brought to a halt when the voltage reaches the shift stroke position P11. In the shift control device of the illustrated embodiment as described above, the operation force of the shift actuator 4 is controlled according to the shift stroke position. Accordingly, the operation time can be made constant from the start of the shifting operation until the completion of the shifting operation irrespective of the operation condition of the vehicle.

Next, the shift control operation of the controller 10 according to the first embodiment will be described with reference to flowcharts shown in FIGS. 7 to 9.

First, the controller 10 checks at step Si whether the clutch pedal switch 91 (SW1) is turned on, i.e., whether the clutch pedal 9 is depressed to disconnect the clutch. When an automatic clutch is mounted, it is checked whether the amount of engagement of the clutch is on the disconnected side rather than the partly-connected state of the clutch based on a signal from the clutch stroke sensor that detects the amount of engagement of the clutch. When the clutch pedal switch 91 (SW1) has been turned on at step S1, the controller 10 judges that the driver is willing to change the speed since the clutch has been disconnected, and proceeds to step S2 to check whether there is a speed-change instruction. The presence of the speed-change instruction can be confirmed based on the speed-change instruction signal from the target gear position instruction means 6. When there is a speed-change instruction at step S2, the controller 10 proceeds to step S3 to operate the driving voltage (V3) for the electric motor 41 (M2) of the shift actuator 4 in the synchronizing range during the gear-engaging operation to the target gear position according to the following equation (1), $$V3=\{(|\text{difference in the synchronizing rotational speed}(N)|\times(C)+\text{base voltage}(V0)\}\times\text{gear ratio}(i) \quad (1)$$

In the above equation (1) for obtaining the driving voltage (V3), the absolute value of the difference (N) in the synchronizing rotational speed can be obtained from the signals detected by the input shaft rotational speed sensor 7 (ISS) and the output shaft rotational speed sensor 8 (OSS) and from the gear ratio (i) of the speed change gear that is to be engaged, i.e., from the gear ratio (i) of the target gear position (|difference (N) in the synchronizing rotational speed |=(input shaft rotational speed/gear ratio)—output shaft rotational speed). The target gear position is a target gear position instructed by the target gear position instruction means 6. In the equation (1) for obtaining the driving voltage (V3), C is a constant. The base voltage (V0). is the driving voltage when the absolute value of the difference (N) in the synchronizing rotational speed becomes zero (0), and is set to be nearly the same as the driving voltage (V2) ranging, for example, from P7a to P10 and from P5a to P2. Thus, the driving voltage (V3) for the electric motor 41 (M2) of the shift actuator 4 in the synchronizing range during the gear-engaging operation is determined. In the synchronizing range during the gear-engaging operation, therefore, the shift actuator 4 produces an operation force corresponding to the difference (N) in the synchronizing rotational speed.

After having operated the driving voltage (V3) for the electric motor 41 (M2) of the shift actuator 4 in the synchronizing range during the gear-engaging operation as described above, the controller 10 proceeds to step S5 to confirm whether the clutch pedal switch 91 (SW1) is turned on, i.e., whether the clutch pedal 9 is depressed to disconnect the clutch. When the clutch pedal switch 91 (SW1) has not been turned on at step S1 and when no speed-change instruction has been issued from the target gear position instruction means 6 at the above step S2, the controller 10 does not execute step S3 but proceeds to step S5 where it is confirmed whether the clutch pedal switch 91 (SW1) has been turned on, i.e., whether the clutch pedal 9 has been depressed to disconnect the clutch. When the clutch pedal switch 91 (SW1) has not been turned on at step S5, the controller 10 judges that the driver is not willing to change the speed since the clutch has not been disconnected, and proceeds to step S6 where the electric motor 41 (M2) of the shift actuator 4 is brought into a halt to end the routine.

When the clutch pedal switch 91 (SW1) has been turned on at step S5, the controller 10 judges that the driver is willing to change the speed since the clutch has been disconnected, and proceeds to step S7 to check whether the target gear position is in agreement with the present gear position. Namely, it is checked whether the target gear position instructed by the target gear position instruction means 6 is not in agreement with the present gear position that is judged based on the detection signals from the select position sensor 35 (SES) and from the shift stroke sensor 45 (SIS). When the target gear position is in agreement with the present gear position, there is no need of changing the speed. Therefore, the controller 10 proceeds to step S6 to bring the electric motor 41 (M2) into a halt. When the target gear position is not in agreement with the present gear position at step S7, the controller 10 proceeds to step S8 to check whether the target gear position is any one of the first gear position, third gear position or fifth gear position. When the target gear position is any one of the first gear position, third gear position or fifth gear position, the controller 10 proceeds to step S9 where the electric motor 41 (M2) is set to rotate forward. The controller 10, then, proceeds to step S10 where it is checked whether the shift stroke position P detected by the shift stroke sensor 45 (SIS) is smaller than P2, i.e., whether the clutch sleeve 252 is on the gear-engaging side rather than the rear end of the chamfer of the dog teeth 241a. When the shift stroke position P is smaller than P2 at step S10, the controller 10 judges that the clutch sleeve 252 is rather on the gear-engaging side than the rear end of the chamfer of the dog teeth 241a and hence, that no large operation force is required. The controller 10 then proceeds to step S11 where the voltage applied to the electric motor 41 (M2) of the shift actuator 4 is gradually decreased and is brought to zero (0) after the shift stroke position P has reached P1.

When the shift stroke position P is larger than P2 at step S10, the controller 10 proceeds to step S12 to check whether the shift stroke position P is larger than P5a but is smaller than P5, i.e., whether the clutch sleeve 252 is in the synchronizing range. When the shift stroke position P is larger than P5a but is smaller than P5 at step S12, the controller 10 judges that the clutch sleeve 252 is in the synchronizing range and a large operation force in the synchronizing range in the gear-engaging operation is required. The controller 10 therefore proceeds to step S13 to drive the electric motor 41 (M2) of the shift actuator 4 with the driving voltage (V3) in the synchronizing range in the gear-engaging operation calculated at step S3.

When the shift stroke position P is not between P5a and P5 at step S12, the controller 10 proceeds to step S14 to check whether the shift stroke position P is larger than P2 but is smaller than P5a, i.e., whether the clutch sleeve 252 is in a range of from a position where the synchronization ends up to a position where the clutch sleeve engages with the chamfer of the dog teeth. When the shift stroke position P is larger than P2 but is smaller than P5a at step S14, the controller 10 judges that the clutch sleeve 252 is in the range of from a position where the synchronization ends up to a position where the clutch sleeve engages with the chamfer of the dog teeth and an operation force is required in a range where clutch sleeve engages with the dog teeth in the gear-engaging operation. The controller 10, then, proceeds to step S15 to drive the electric motor 41 (M2) of the shift actuator 4 with the driving voltage V2.

When the shift stroke position P is not between P2 and P5a at step S14, the controller 10 proceeds to step S16 to check whether the shift stroke position P is the neutral position P6. When the shift stroke position P is in the neutral range (P5≦P<P7) at step S16, the controller 10 proceeds to step S17 to check whether the present select position is in agreement with the target select position. The present select position is obtained from the signal detected by the select position sensor 35 (SES). Further, the target select position can be obtained from the select position corresponding to the target gear position instructed by the target gear position instruction means 6. When the present select position is in agreement with the target select position at step S17, the shifting operation is executed at the present select position up to the synchronization start position P5. For this purpose, the controller 10 proceeds to step S18 to drive the electric motor 41 (M2) of the shift actuator 4 with the above driving voltage V4. On the other hand, when the present select position is not in agreement with the target select position at step S17, the selection operation must be executed. For this purpose, the controller 10 proceeds to step S19 to bring the electric motor 41 (M2) of the shift actuator 4 into a halt. The controller 10, then, proceeds to step S20 to execute the select control operation.

Here, output characteristics of the select position sensor 35 (SES) will be described with reference to FIG. 11.

Figure 11:
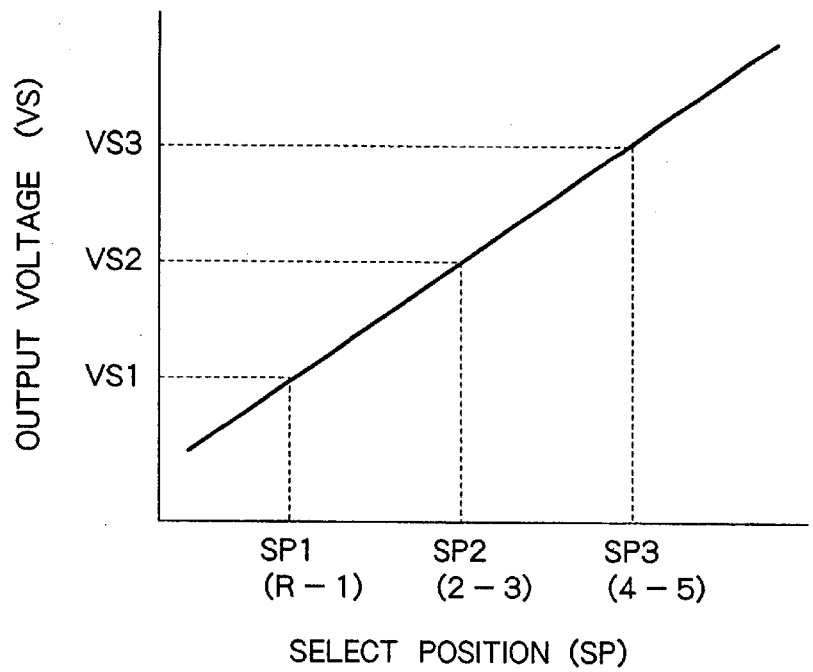
FIG. 11 is a diagram illustrating the output characteristics of a select position sensor that detects the select position of the speed change operation mechanism shown in FIG. 4.

The select position sensor 35 (SES) for detecting the operation position of the select actuator 3 comprises a potentiometer and has output characteristics as shown in FIG. 11. The select position sensor 35 (SES) produces a voltage signal (VS) of a small value (VS1) at a first select position SP1 (reverse—first speed select position) shown in FIG. 5. It is so constituted that the output voltage (VS) gradually increases with movement toward the third select position shown in FIG. 5. Namely, the select position sensor 35 (SES) in the illustrated embodiment produces a voltage VS1 at a first select position SP1 (reverse—first speed select position), produces a voltage VS2 at a second select position SP2 (second speed—third speed select position), and produces a voltage VS3 at a third select position SP3 (fourth speed—fifth speed select position). The select positions SP1, SP2 and SP3 are here shown as predetermined positions, though they have predetermined ranges practically.

Figure 10:
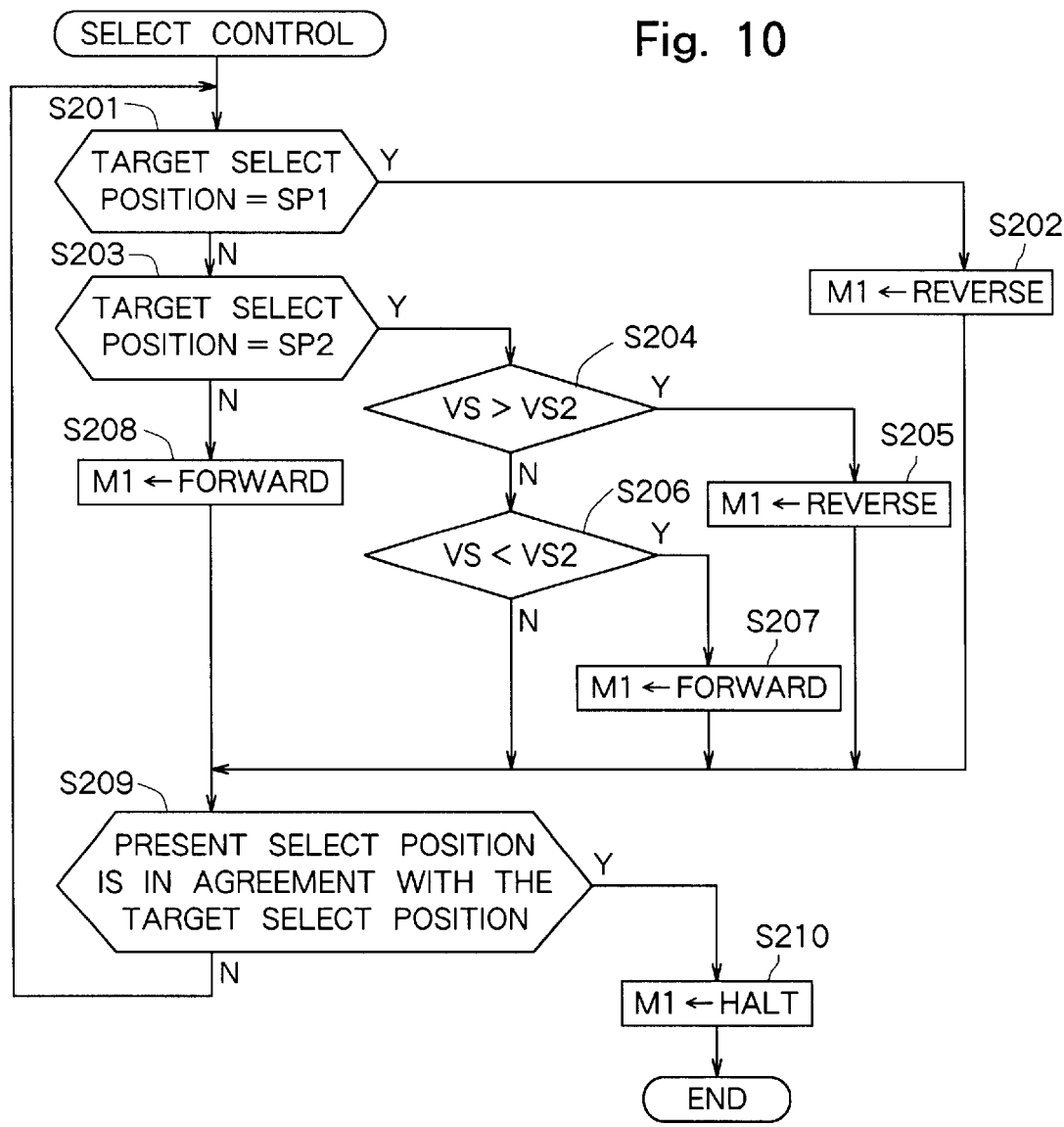
FIG. 10 is a partial flowchart illustrating a procedure of the select control operation of the controller constituting the shift control device for the transmission constituted according to the first embodiment of the present invention.

Next, the select control will be described with reference to a flowchart shown in FIG. 10.

At step S201, first, the controller 10 checks whether the target select position is the first select position SP1 (reverse—first speed select position). The target select position can be judged based on a select position corresponding to the target gear position instructed by the target gear position instruction means 6. When the target select position is the first select position SP1 (reverse—first speed select position) at step S201, the controller 10 proceeds to step S202 to, for example, reversely drive the electric motor 41 (M1) of the select actuator 3.

On the other hand, when the target select position is not the first select position SP1 (reverse—first speed select position) at step S201, the controller 10 proceeds to step S203 to check whether the target select position is the second select position SP2 (second speed—third speed select position). When the target select position is the second select position SP2 (second speed—third speed select position) at step S203, the controller 10 proceeds to step S204 to check whether the output voltage (VS) from the select position sensor 35 (SES) is larger than the output voltage VS2 that corresponds to the second select position SP2 (second speed—third speed select position), i.e., whether the operation position of the select actuator 3 is on the side of the third select position SP3 (fourth speed—fifth speed select position) rather than on the second select position SP2 (second speed—third speed select position). When the output voltage (VS) of the select position sensor 35 (SES) is larger than the output voltage VS2 that corresponds to the second select position SP2 (second speed—third speed select position) at step S204, the controller 10 judges that the operation of the select actuator 3 is on the side of the third select position SP3 (fourth speed—fifth speed select position) rather than on the side of the second select position SP2 (second speed—third speed select position). The controller 10, then, proceeds to step S205 to, for example, reversely drive the electric motor 31 (M1) of the select actuator 3.

When the output voltage (VS) from the select position sensor 35 (SES) is not larger than the output voltage VS2 that corresponds to the second select position SP2 (second speed—third speed select position) at step S204, the controller 10 proceeds to step S206 to check whether the output voltage (VS) from the select position sensor 35 (SES) is smaller than the output voltage VS2 corresponding to the second select position SP2 (second speed—third speed select position), i.e., whether the operation position of the select actuator 3 is on the side of the first select position SP1 (reverse—first speed select position) rather than on the side of the second select position SP2 (second speed—third speed select position). When the output voltage (VS) of the select position sensor 35 (SES) is smaller than the output voltage VS2 corresponding to the second select position SP2 (second speed—third speed select position) at step S206, the controller 10 judges that the operation position of the select actuator 3 is on the side of the first select position SP1 (reverse—first speed select position) rather than on the second select position SP2 (second speed third speed select position), and proceeds to step S207 to, for example, drive the electric motor 31 (M1) of the select actuator 3 forward.

When the target select position is not the second select position SP2 (second speed—third speed select position) at step S203, the target gear position instructed by the target gear position instruction means 6 is the third speed or the fifth speed. Accordingly, the controller 10 judges that the target select position is the third select position SP3 (fourth speed—fifth speed select position) and proceeds to step S208 to, for example, drive the electric motor 31 (M1) of the select actuator 3 forward.

After the electric motor 31 (M1) of the select actuator 3 is driven forward or reverse, as necessary, to 6 achieve the target select position as described above, the controller 10 proceeds to step S209 to check whether the present select position is in agreement with the target select position. When the present select position is in agreement with the target select position, the controller 10 judges that the shift operation to the target gear position is possible, and proceeds to step S210 to bring the electric motor 31 (M1) of the select actuator 3 to a halt. On the other hand, when the present select position is not in agreement with the target select position at step S209, the controller 10 returns back to step S201 and repetitively executes step S201 through step S209 until the present select position is brought into agreement with the target select position. The controller 10 then proceeds to step S210.

Figure 8:
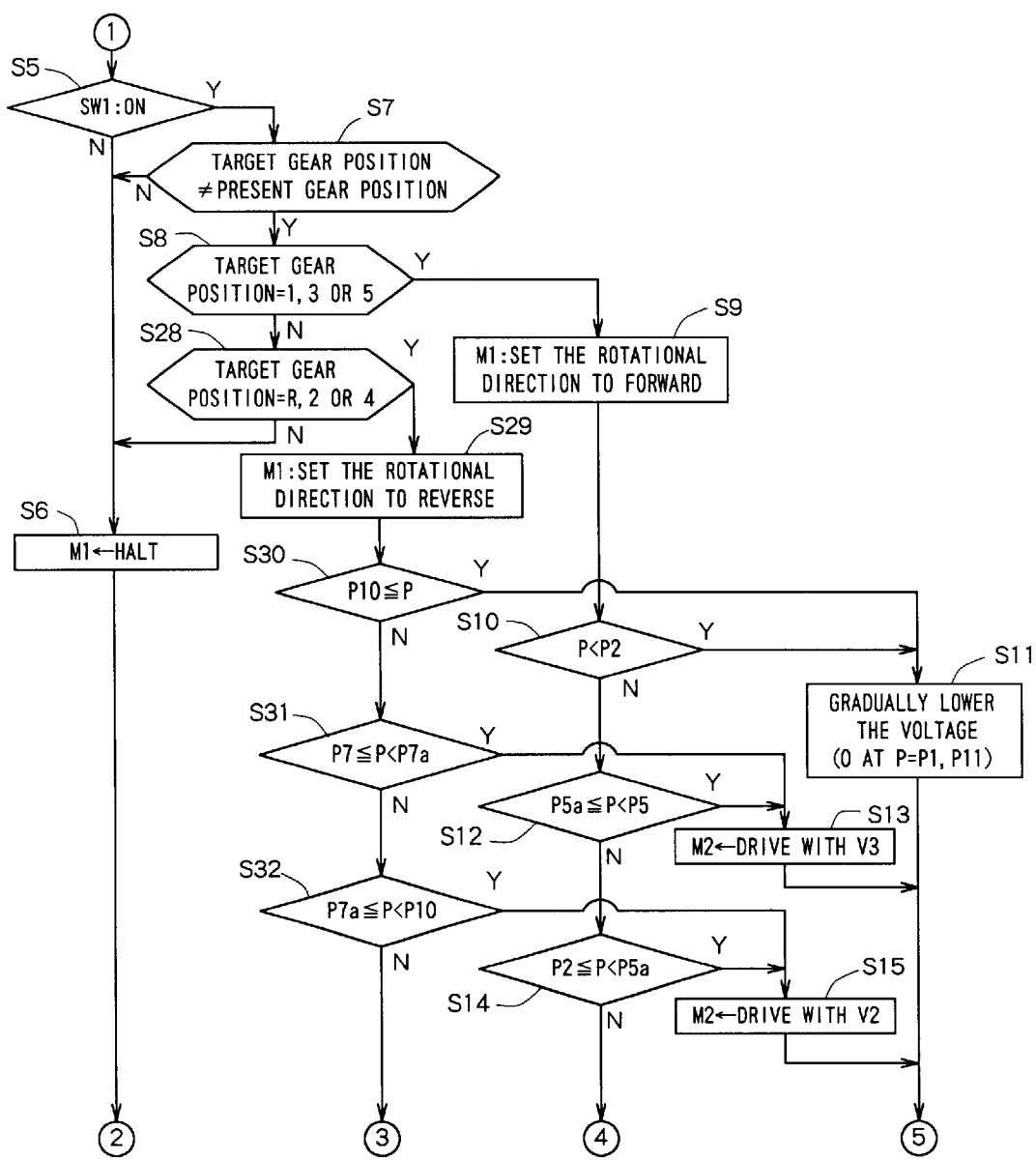
FIGS. 8 and 9 provide a flowchart illustrating a procedure of the shift control operation of the controller constituting the shift control device for the transmission constituted according to a first embodiment of the present invention.
Figure 9:
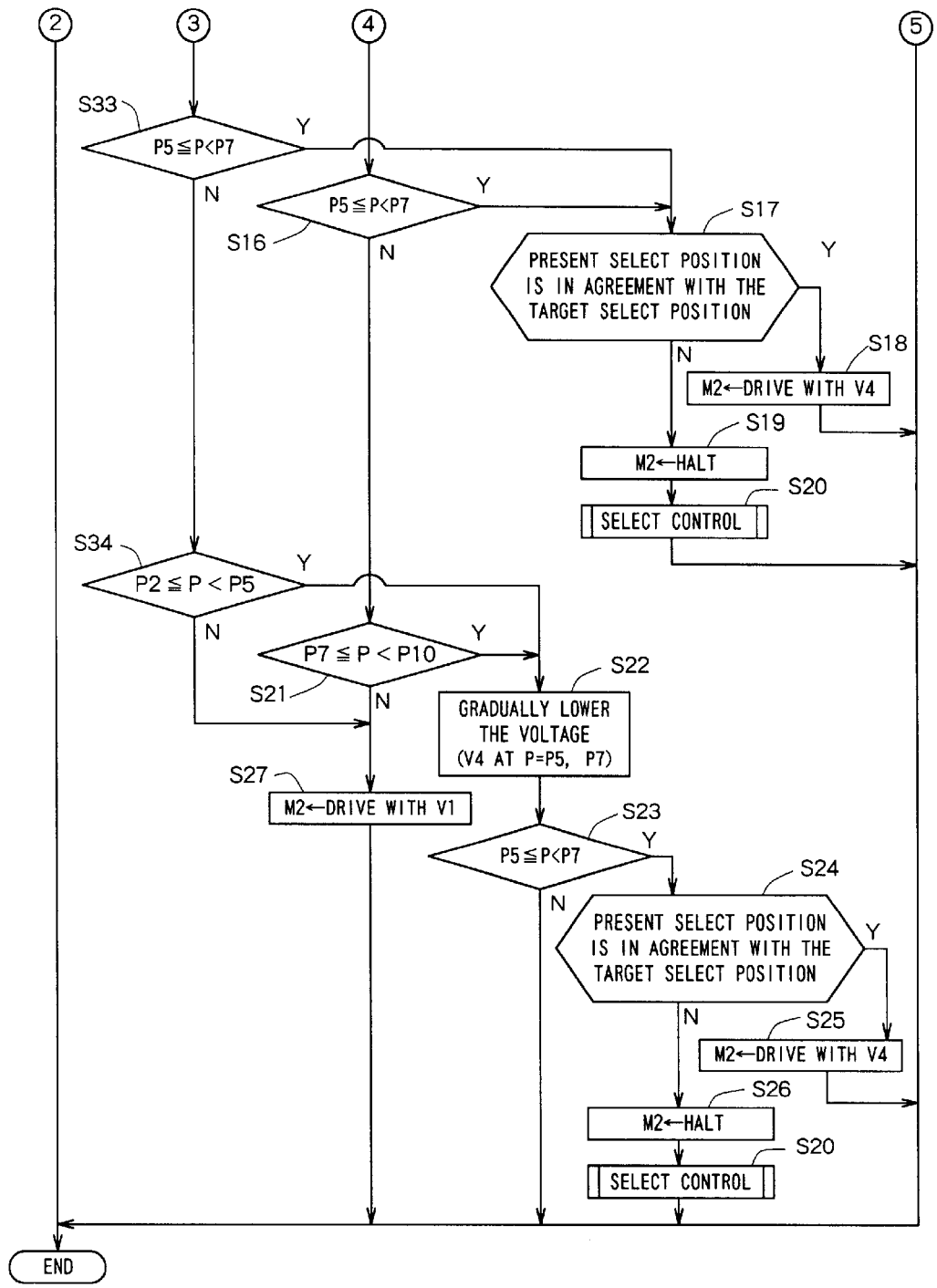

Reverting to FIGS. 8 and 9, when the shift stroke position P does not lie in the neutral range (P5≦P<P7) at step S16, the controller 10 proceeds to step S21 to check whether the shift stroke position P is larger than P7 but is smaller than P10, i.e., whether the clutch sleeve 252 is disengaged from the dog teeth 242a and the disengagement is completed. When the shift stroke position P is larger than P7 but is smaller than P10 at step S21, the controller 10 judges that the clutch sleeve 252 is disengaged from the dog teeth 242a and the disengagement is completed. The controller 10, then proceeds to step S22 where the voltage applied to the electric motor 41 (M2) of the shift actuator 4 is gradually lowered, and the voltage V4 is set at P5 or P7. The controller 10 proceeds to step S23 to check whether the shift stroke position P has reached the neutral range (P5≦P<P7). After the shift stroke position has reached the neutral range (P5≦P<P7), the controller 10 proceeds to step S24 to check whether the present select position is in agreement with the target select position based on a detection signal from the select position sensor 35 (SES). When the present select position is in agreement with the target select position at step S24, the controller 10 proceeds to step S25 to continuously drive the electric motor 41 (M2) of the shift actuator 4 with the above driving voltage V4. On the other hand, when the present select position is not in agreement with the target select position at step S24, the select operation must be executed. Accordingly, the controller 10 proceeds to step S26 to no longer drive the electric motor 41 (M2) of the shift actuator 4. The controller 10 then proceeds to step S20 to execute the select control operation.

When the shift stroke position P is not between P7 and P10 at step S21, the controller 10 judges that the clutch sleeve 252 is in mesh with the dog tooth 242a and that an operation force for disengaging the gear is required. The controller 10, then, proceeds to step S27 to drive the electric motor 41 (M2) of the shift actuator 4 with the driving voltage (Vi) which is for disengaging the gear.

Next, described below is the case where the target gear position is none of the first gear position, third gear position or fifth gear position at step S8.

When the target gear position is none of the first gear position, third gear position or fifth gear position at step S8, the controller 10 proceeds to step S28 to check whether the target gear position is any one of the reverse gear position, second gear position or fourth gear position. When the target gear position is none of the reverse gear position, second gear position or fourth gear position at step S28, the controller 10 so judges that the driver is not willing to change the speed, and proceeds to step S6 to end the routine by bringing the electric motor 41 (M2) of the shift actuator 4 into a halt.

When the target gear position is any one of the reverse gear position, second gear position or fourth gear position at step S28, the controller 10 proceeds to step S29 to set to reversely rotate the electric motor 41 (M2) of the shift actuator 4. The controller 10, further, proceeds to step S30 to check whether the shift stroke position P detected by the shift stroke sensor 45 (SS) is larger than P10, i.e., whether the clutch sleeve 252 is on the gear-engaging side rather than the rear end of the chamfer of the dog teeth 242a. When the shift stroke position P is larger than P10 at step S30, the controller 10 judges that the clutch sleeve 252 is on the gear-engaging side rather than the rear end of the chamfer of the dog teeth 242a, and proceeds to step S11 where the voltage applied to the electric motor 41 (M2) of the shift actuator 4 is gradually lowered and is brought to zero (0) after the shift stroke position P has reached P11.

When the shift stroke position P is smaller than P10 at step S30, the controller 10 proceeds to step S31 to check whether the shift stroke position P is larger than P7 but is smaller than P7a, i.e., whether the clutch sleeve 252 is in the synchronizing range. When the shift stroke position P is larger than P7 but is smaller than P7a at step S31, the controller 10 judges that the clutch sleeve 252 is within the synchronizing range and that the operation force is required in the synchronizing range in the gear-engaging operation. The controller 10, then, proceeds to step S13 to drive the electric motor 41 (M2) of the shift actuator 4 with the driving voltage (V3) in the synchronizing range in the gear-engaging operation calculated at step S3.

When the shift stroke position P is not between P7 and P7a at step S31, the controller 10 proceeds to step S32 to check whether the shift stroke position P is larger than P7a but is smaller than P10, i.e., whether the clutch sleeve 252 is in the range of from a position where the synchronization ends to a position where it engages with the chamfer of the dog teeth. When the shift stroke position P is larger than P7a but is smaller than P10 at step S32, the controller 10 judges that the clutch sleeve 252 is in the range of from the position where the synchronization ends to the position where it engages with the chamfer of the dog teeth and that an operation force is required in the range where the clutch sleeve engages with the dog tooth during the gear-engaging operation. The controller 10, then, proceeds to step S15 to drive the electric motor 41 (M2) of the shift actuator 4 with the above driving voltage V2.

When the shift stroke position P is not between P7a and P10 at step S32, the controller 10 proceeds to step S33 to check whether the stroke position P lies in the neutral range (P5≦P<P7). When the shift stroke position P lies in the neutral range (P5≦P<P7) at step S33, the controller 10 proceeds to step S17 to execute step S17 through step S20, described above.

When the shift stroke position P does not lie in the neutral range (P5≦P<P7) at step S33, the controller 10 proceeds to step S34 to check whether the shift stroke position P is larger than P2 but is smaller than P5, i.e., whether the clutch sleeve 252 is disengaged from the dog teeth 241a and the disengagement is completed. When the shift stroke position P is larger than P2 but is smaller than P5 at step S34, the controller 10 judges that the clutch sleeve 252 is disengaged from the dog teeth 241a and the disengagement is completed. The controller 10, then, proceeds to step S22 to execute step S22 through step S24, described above.

When the shift stroke position P is not between P2 and P5 at step S34, the controller 10 judges that the clutch sleeve 252 is in mesh with the dog teeth 241a and, that the operation force in the gear-disengaging operation is required. The controller 10, then, proceeds to step S27 to drive the electric motor 41 (M2) of the shift actuator 4 with the driving voltage (V1) of during the gear-disengaging operation.

Next, the shift control of the controller 10 according to a second embodiment will be described with reference to a flowchart shown in FIG. 12.

Figure 7:
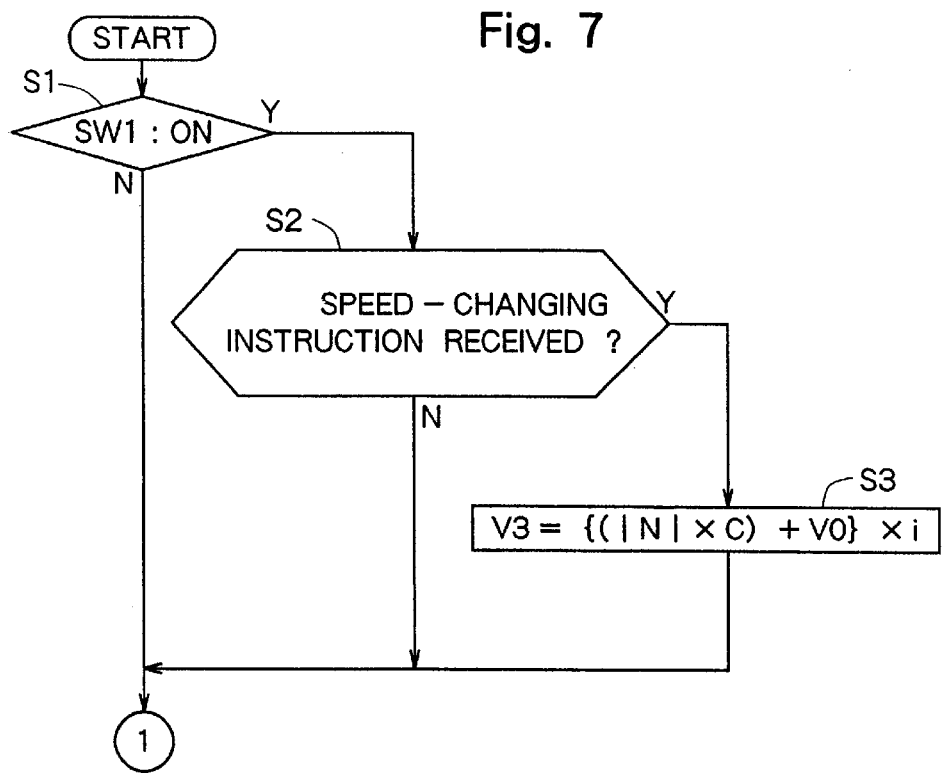
FIG. 7 is a partial flowchart illustrating the procedure of shift control operation of a controller that constitutes a shift control device for the transmission constituted according to a first embodiment of the present invention.
Figure 12:
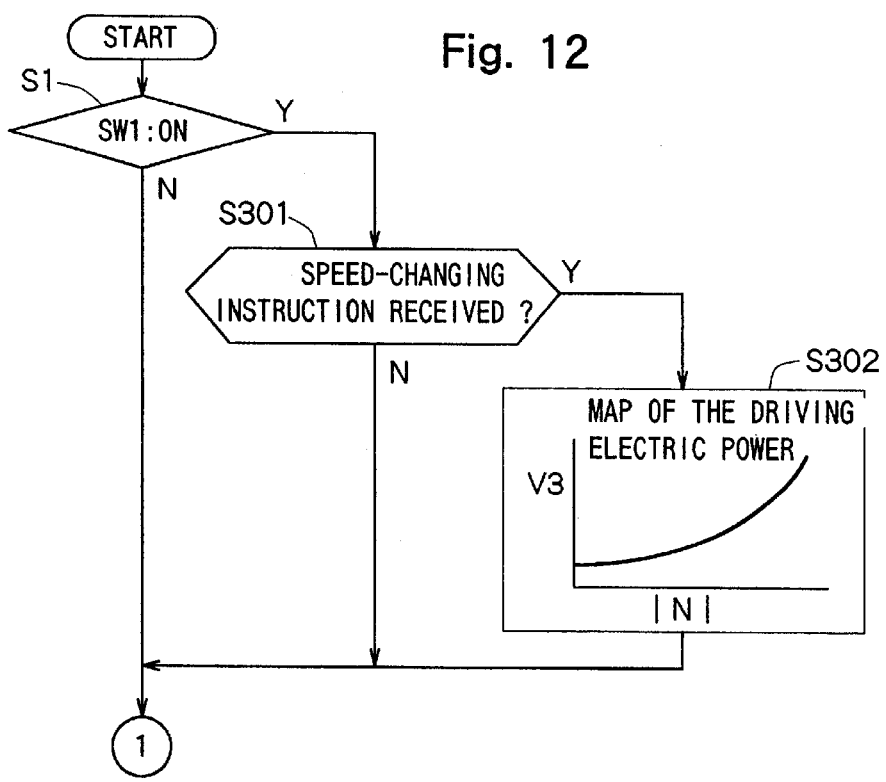
FIG. 12 is a partial flowchart illustrating a procedure of the shift control operation of the controller constituting the shift control device for the transmission constituted according to a second embodiment of the present invention.

The flowchart shown in FIG. 12 according to the second embodiment corresponds to steps Si through S3 in the flowchart of the first embodiment shown in FIGS. 7 to 9. The second embodiment is different from the first embodiment only in regard to obtaining the driving voltage (V3) for the electric motor 41 (M2) of the shift actuator 4 in the synchronizing range in engaging the gear to the target gear position at step S3 in the first embodiment. In regard to other steps, the second embodiment is substantially the same as the first embodiment. The second embodiment is provided with a map of the driving electric power in the synchronizing range where the driving electric power (V3) is set to correspond to a function and the absolute value of the difference (N) in the synchronizing rotational speed as shown at step S302 in the flowchart of FIG. 12. The map of the driving electric power is stored in the read-only memory (ROM) 102 of the controller 10. In the second embodiment shown by the flowchart of FIG. 12, like in the first embodiment, the controller 10 checks at step S1 whether the clutch pedal switch 91 (SW1) is turned on, i.e., whether the clutch pedal 9 is depressed to disconnect the clutch. When the clutch pedal switch 91 (SW1) has been turned on at step S1, the controller 10 judges that the driver is willing to change the speed since the clutch has been disconnected, and proceeds to step S301 to check whether there is a speed-change instruction. The presence of the speed-change instruction can be confirmed based on the speed-change instruction signal from the target gear position instruction means 6. When the speed-change instruction from the target gear position instruction means 6 is confirmed at step S301, the controller 10 proceeds to step S302 to obtain the driving voltage (V3) for the electric motor 41 (M2) of the shift actuator 4 in the synchronizing range during the gear-engaging operation from the map of the driving electric power in the synchronizing range, in which the driving electric power (V3) is set to correspond to a function of the absolute value of the above-mentioned difference (N) in the synchronizing rotational speed. The absolute value of the difference (N) in the synchronizing rotational speed can be obtained from the signals detected by the input shaft rotational speed sensor 7 (ISS) and the output shaft rotational speed sensor 8 (OSS) and from the gear ratio (i) of the speed change gear of the target gear position that is to be engaged (|difference (N) in the synchronizing rotational speed|= (input shaft rotational speed/gear ratio)−output shaft rotational speed). The target gear position that is to be engaged can be specified by the target gear position instruction signal instructed by the target gear position instruction means 6. By operating the absolute value of the difference (N) in the synchronizing rotational speed as described above, it is allowed to obtain the driving voltage (V3) for the electric motor 41 (M2) of the shift actuator 4 in the synchronizing range in the gear-engaging operation to the target gear position from the map of the driving electric power shown at step S301.

As described above, the second embodiment is provided with a map of the driving electric power in the synchronizing range, in which the driving electric power (V3) is set to correspond to a function of the absolute value of the difference (N) in the synchronizing rotational speed, and obtains the driving voltage (V3) in the synchronizing range in the gear-engaging operation to the target gear position from the map of the driving electric power based on the difference (N) in the synchronizing rotational speed. In the synchronizing range in the gear-engaging operation to the target gear position, therefore, it is allowed to obtain the operation force of the shift actuator 4, that corresponds to a function of the difference (N) in the synchronizing rotational speed, like in the above-mentioned first embodiment.

After having executed step S1 through up to step S302 to obtain the driving voltage (V3) for the electric motor 41 (M2) of the shift actuator 4 in the synchronizing range in the gear-engaging operation from the map of the driving electric power, the controller 10 proceeds to step S5 in the first embodiment shown in the flowchart of FIGS. 7 to 9 to execute step S5 through step S32.

Next, the shift control operation of the controller 10 according to a third embodiment will be described with reference to a flowchart shown in FIG. 13.

Figure 13:
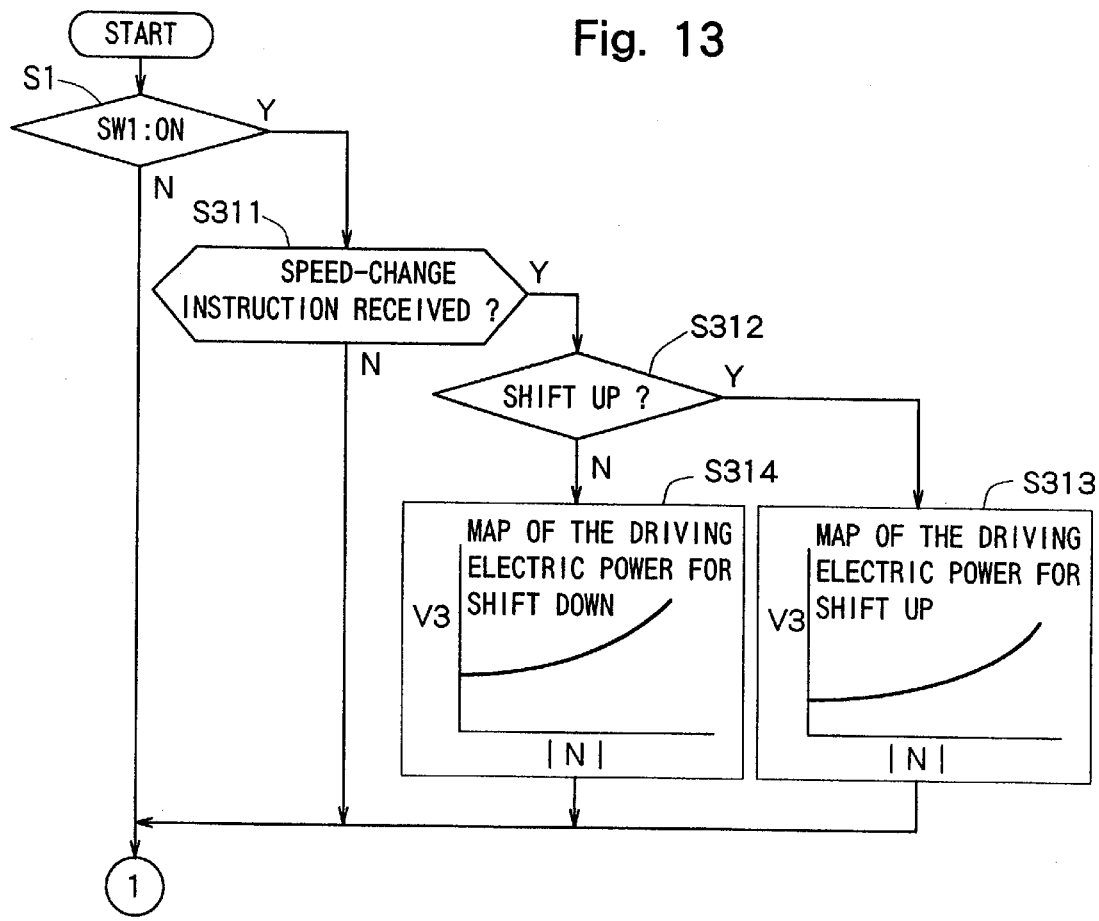
FIG. 13 is a partial flowchart illustrating a procedure of the shift control operation of the controller constituting the shift control device for the transmission constituted according to a third embodiment of the present invention.

The flowchart shown in FIG. 13 according to the third embodiment corresponds to steps S1 through S302 in the flowchart of the second embodiment shown in FIG. 12. The second embodiment has one map of the driving electric power in the synchronizing range, in which the driving electric power (V3) is set to correspond to a function of the absolute value of the difference in the synchronizing rotational speed. The third embodiment, however, has two kinds of maps of the driving electric power for shift-up and for shift-down in the synchronizing range, in which the driving electric power (V3) is set to correspond to the functions of absolute value of the difference (N) in the synchronizing rotational speed. That is, the third embodiment shown in FIG. 13 is provided with a map of the driving electric power for shift-up shown at step S313 and a map of the driving electric power for shift-down shown at step S314, the maps of the driving electric powers being stored in the read-only memory (ROM) 102 of the controller 10. The map of the driving electric power for shift-down is so set that the value of the driving electric power (V3) for the absolute value of the difference (N) in the synchronizing rotational speed is larger than that of the map of the driving electric power for shift-up. Therefore, the shift assist force produced by the electric motor 41 (M2) of the shift actuator 4 at the time of shift-down is larger than that at the time of shift-up. This is because the stirring resistance, produced when the counter gears being in mesh with the speed change gears stir the lubricating oil, advantageously acts on the synchronizing operation at the time of shift-up and disadvantageously acts on the synchronizing operation at the time of shift-down. When the difference (N) in the synchronizing rotational speed is the same, therefore, it is desired to produce an operation force which is larger at the time of shift-down than that at the time of shift-up.

Described below with reference to the flowchart of FIG. 13 is the third embodiment equipped with the two kinds of maps of the driving electric power for shift-up and for shift-down in the synchronizing range, in which the driving electric power (V3) is set to correspond to functions of the absolute value of the difference (N) in the synchronizing rotational speed.

First, like in the first embodiment or in the second embodiment, the controller 10 checks at step S1 whether the clutch pedal switch 91 (SW1) is turned on, i.e., whether the clutch pedal 9 is depressed to disconnect the clutch. When the clutch pedal switch 91 (SW1) has been turned on at step S1, the controller 10 judges that the driver is willing to change the speed since the clutch has been disconnected, and proceeds to step S311 to check whether there is a speed-change instruction. The presence of the speed-change instruction can be confirmed based on the speed-change instruction signal from the target gear position instruction means 6. When there is the speed-change instruction at step S311, the controller 10 proceeds to step S312 to check whether the target gear position to be engaged is for shift-up or for shift-down. Whether it is for shift-up or is for shift-down can be judged based on the target gear position instructed by the target gear position instruction means 6 and the speed change gear (present gear position) that has been engaged up to now. Or, whether it is for shift-up or for shift-down can be judged by comparing the rotational speed of the synchronizing side (clutch sleeve) with the rotational speed of the to-be-synchronized side (speed change gear to be engaged). That is, the rotational speed of the clutch sleeve of the synchronizing side is the same as the rotational speed of the output shaft and hence, can be obtained based on a signal detected by the output shaft rotational speed sensor 8 (OSS). And, the rotational speed of the speed change gear of the target gear position on the to-be-synchronized side is obtained by dividing the rotational speed of the input shaft by the gear ratio (rotational speed of the input shaft/gear ratio) and can, therefore, be obtained based on a signal detected by the input shaft rotational speed sensor 7 (ISS) and the gear ratios of the speed change gears stored in the read-only memory (ROM) 102. When the rotational speed of the clutch sleeve on the synchronizing side is larger than the rotational speed of the speed change gear of the target gear position on the to-be-synchronized side, it is judged that a shift-down is to be executed. When the rotational speed of the clutch sleeve on the synchronizing side is smaller than the rotational speed of the speed change gear of the target gear position on the to-be-synchronized side, it is judged that a shift-up is to be executed.

When it is judged at step S312 that the speed change gear to be engaged is for shift-up, the controller 10 proceeds to step S313 to obtain a driving voltage (V3) for the electric motor 41 (M2) of the shift actuator 4 in the synchronizing range in the gear-engaging operation to the target gear position from the map of the driving electric power for shift-up in the synchronizing range, in which the driving electric power (V3) is set to correspond to a function of the absolute value of the difference (N) in the synchronizing rotational speed. The absolute value of the difference (N) in the synchronizing rotational speed can be obtained from the signals detected by the input shaft rotational speed sensor 7 (ISS) and the output shaft rotational speed sensor 8 (OSS) and from the gear ratio (i) of the target gear position, i.e., of the speed change gear that is to be engaged (|difference (N) in the synchronizing rotational speed|=(input shaft rotational speed/gear ratio)−output shaft rotational speed). The target gear position can be specified by an instruction signal from the target gear position instruction means 6, as described above. When it is judged at step S312 that the target gear position is not for shift-up but is for shift-down, the controller 10 proceeds to step S314 to obtain the driving voltage (V3) for the electric motor 41 (M2) of the shift actuator 4 in the synchronizing range in the gear-engaging operation to the target gear position from the map of the driving electric power for shift-down in the synchronizing range, in which the driving electric power (V3) is set to correspond to a second function of the absolute value of the difference (N) in the synchronizing rotational speed.

As described above, the third embodiment is provided with the map of the driving electric power for shift-up and with the map of the driving electric power for shift-down in the synchronizing range, in which the driving electric power (V3) is set to correspond to functions of the absolute value of the difference (N) in the synchronizing rotational speed, and the driving voltage (V3) for the electric motor 41 (M2) of the shift actuator 4 in the synchronizing range in the gear-engaging operation to the target gear position can be obtained from the map of the driving electric power for shift-up and from the map of the driving electric power for shift-down based on the difference (N) in the synchronizing rotational speed in the early stage of synchronization. In the synchronizing range during the gear-engaging operation to the target gear position, therefore, it is allowed to obtain the operation force of the shift actuator 4 that corresponds to functions of the difference (N) in the synchronizing rotational speed and the shift-up or the shift-down.

As described above, after having executed step S1 through up to step S314 to obtain the driving voltage (V3) for the electric motor 41 (M2) of the shift actuator 4 in the synchronizing range in the gear-engaging operation to the target gear position from the map of the driving electric power for shift-up and from the map of the driving electric power for shift-down, the routine proceeds to step S5 in the first embodiment shown in the flowchart of FIGS. 7 to 9 to execute step S5 through step S27.

Next, the shift control operation of the controller 10 according to a fourth embodiment will be described with reference to a flowchart shown in FIGS. 14 and 15.

Figure 14:
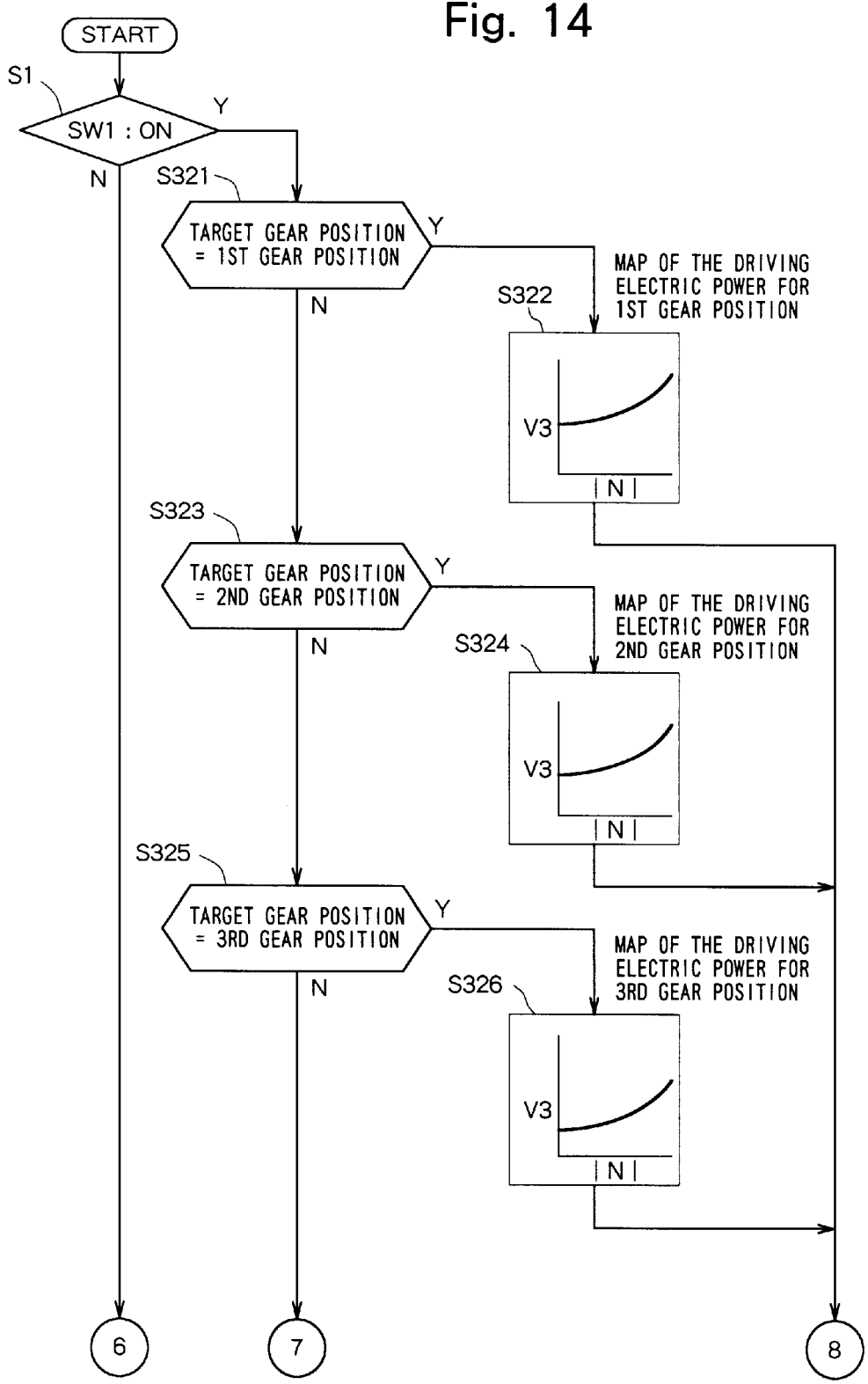
FIGS. 14 and 15 provide a partial flowchart illustrating a procedure of the shift control operation of the controller constituting the shift control device for the transmission constituted according to a fourth embodiment of the present invention.
Figure 15:
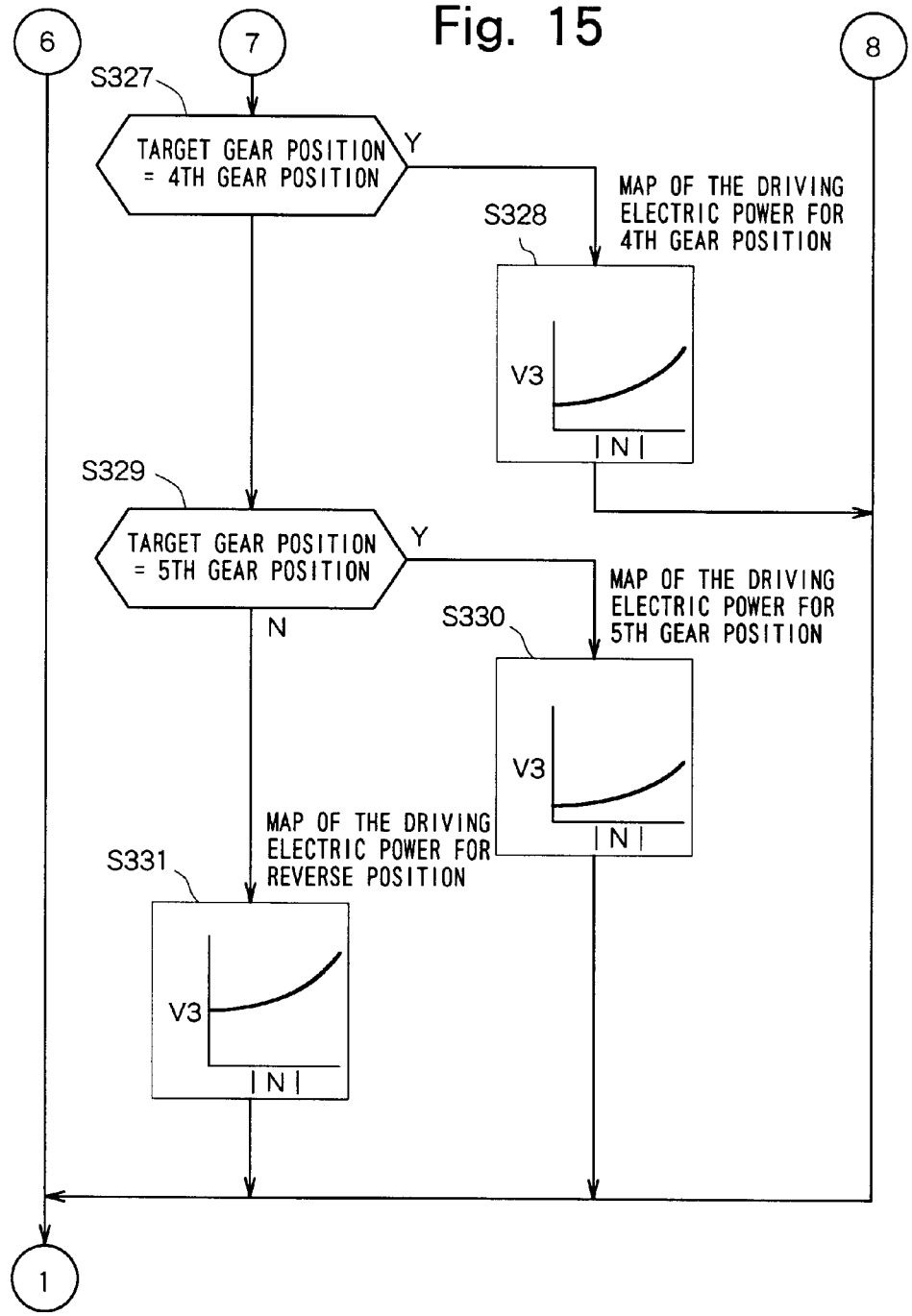

The flowchart shown in FIGS. 14 and 15 according to the fourth embodiment corresponds to steps S1 through S302 in the flowchart of the second embodiment shown in FIG. 12. The second embodiment has one map of the driving electric power in the synchronizing range, in which the driving electric power (V3) is set to correspond to a function of the absolute value of the difference in the synchronizing rotational speed. The fourth embodiment, however, has maps of the driving electric power in the synchronizing range, in which the driving electric power (V3) is set to correspond to the absolute value of the difference (N) in the synchronizing rotational speed for each of the speed change gears of each of the gear positions. That is, the fourth embodiment shown in FIGS. 14 and 15 is provided with a map of the driving electric power for the first speed shown at step S322, a map of the driving electric power for the second speed shown at step S324, a map of the driving electric power for the third speed shown at step S326, a map of the driving electric power for the fourth speed shown at step S328, and a map of the driving electric power for the reverse shown at step S331, the maps of the driving electric powers being stored in the read-only memory (ROM) 102 of the controller 10. The maps of the driving electric powers have been so set that the value of the driving electric power (V3) for the absolute value of the difference (N) in the synchronizing rotational speed is larger for the lower speeds having larger gear ratios of the speed change gears of each of the gear positions. Therefore, a large operation force is produced by the electric motor 41 (M2) of the shift actuator 4 having a large gear ratio of the speed change gear in the gear position.

Described below with reference to the flowchart of FIGS. 14 and 15 is the fourth embodiment equipped with the maps of the driving electric power in the synchronizing range, in which the driving electric power (V3) is set to correspond to functions of the absolute value of the difference (N) in the synchronizing rotational speed for each of the speed change gears.

First, like in the first embodiment or in the second embodiment, the controller 10 checks at step S1 whether the clutch pedal switch 91 (SW1) is turned on, i.e., whether the clutch pedal 9 is depressed to disconnect the clutch. When the clutch pedal switch 91 (SW1) has been turned on at step S1, the controller 10 judges that the driver is willing to change the speed since the clutch has been disconnected and proceeds to step S321 to check whether the target gear position is the first gear position. The target gear position can be specified based on the speed-change instruction signal from the target gear position instruction means 6. When the target gear position is the first gear position at step S321, the controller 10 proceeds to step S322 to obtain a driving voltage (V3) for the electric motor 41 (M2) of the shift actuator 4 corresponding to a first function of the absolute value of the difference (N) in the synchronizing rotational speed in the synchronizing range during the gear-engaging operation from the map of the driving electric power for the first gear position. Here, the absolute value of the difference (N) in the synchronizing rotational speed can be obtained from the signals detected by the input shaft rotational speed sensor 7 (ISS) and the output shaft rotational speed sensor 8 (OSS) and from the gear ratio (i) of the speed change gear (first-speed gear this time) of the target gear position that is to be engaged (|difference (N) in the synchronizing rotational speed|=(input shaft rotational speed/gear ratio)− output shaft rotational speed).

When the target gear position is not the first gear position at step S321, the controller 10 proceeds to step S323 to check whether the target gear position is the second gear position. When the target gear position is the second gear position at step S323, the controller 10 proceeds to step S324 to obtain the driving voltage (V3) for the electric motor 41 (M2) of the shift actuator 4 that corresponds to a second function of the absolute value of the difference (N) in the synchronizing rotational speed in the synchronizing range during the gear-engaging operation from the map of the driving electric power for the second gear position.

When the target gear position is not the second gear position at step S323, the controller 10 proceeds to step S325 to check whether the target gear position is the third gear position. When the target gear position is the third gear position at step S325, the controller 10 proceeds to step S326 to obtain the driving voltage (V3) for the electric motor 41 (M2) of the shift actuator 4 that corresponds to a third function of the absolute value of the difference (N) in the synchronizing rotational speed in the synchronizing range during the gear-engaging operation from the map of the driving electric power for the third gear position.

When the target gear position is not the third gear position at step S325, the controller 10 proceeds to step S327 to check whether the target gear position is the fourth gear position. When the target gear position is the fourth gear position at step S327, the controller 10 proceeds to step S328 to obtain the driving voltage (V3) for the electric motor 41 (M2) of the shift actuator 4 that corresponds to a fourth function of the absolute value of the difference (N) in the synchronizing rotational speed in the synchronizing range during the gear-engaging operation from the map of the driving electric power for the fourth gear position.

When the target gear position is not the fourth gear position at step S327, the controller 10 proceeds to step S329 to check whether the target gear position is the fifth gear position. When the target gear position is the fifth gear position at step S339, the controller 10 proceeds to step S330 to obtain the driving voltage (V3) for the electric motor 41 (M2) of the shift actuator 4 that corresponds to a fifth function of the absolute value of the difference (N) in the synchronizing rotational speed in the synchronizing range during the gear-engaging operation from the map of the driving electric power for the fifth gear position.

When the target gear position is not the fifth gear position at step S329, the controller 10 judges that the target gear position instructed by the target gear position instruction means 6 is the reverse gear position. The controller 10, then, proceeds to step S331 to obtain the driving voltage (V3) for the electric motor 41 (M2) of the shift actuator 4 that corresponds to a further function of the absolute value of the difference (N) in the synchronizing rotational speed in the synchronizing range during the gear-engaging operation from the map of the driving electric power for the reverse gear position.

As described above, the fourth embodiment is provided with maps of the driving electric power in the synchronizing range, in which the driving electric power (V3) is set to correspond to functions of the absolute value of the difference (N) in the synchronizing rotational speed for each of the speed change gears, and the driving voltage (V3) for the electric motor 41 (M2) of the shift actuator 4 in the synchronizing range in the gear-engaging operation can be obtained from the appropriate map of the driving electric power set for each of the speed change gears based on the difference (N) in the synchronizing rotational speed in the early stage of synchronization. In the synchronizing range of during the gear-engaging operation, therefore, it is allowed to obtain the operation force of the shift actuator 4 that corresponds to the difference (N) in the synchronizing rotational speed and to each of the speed change gears.

As described above, after having executed step S1 through up to step S331 to obtain the driving voltage (V3) for the electric motor 41 (M2) of the shift actuator 4 in the synchronizing range in the gear-engaging operation from the appropriate map of the driving electric power set for the speed change gears, the controller 10 proceeds to step S5 in the first embodiment shown in the flowchart of FIGS. 7 to 9 to execute step S5 through step S27.

Figure 16:
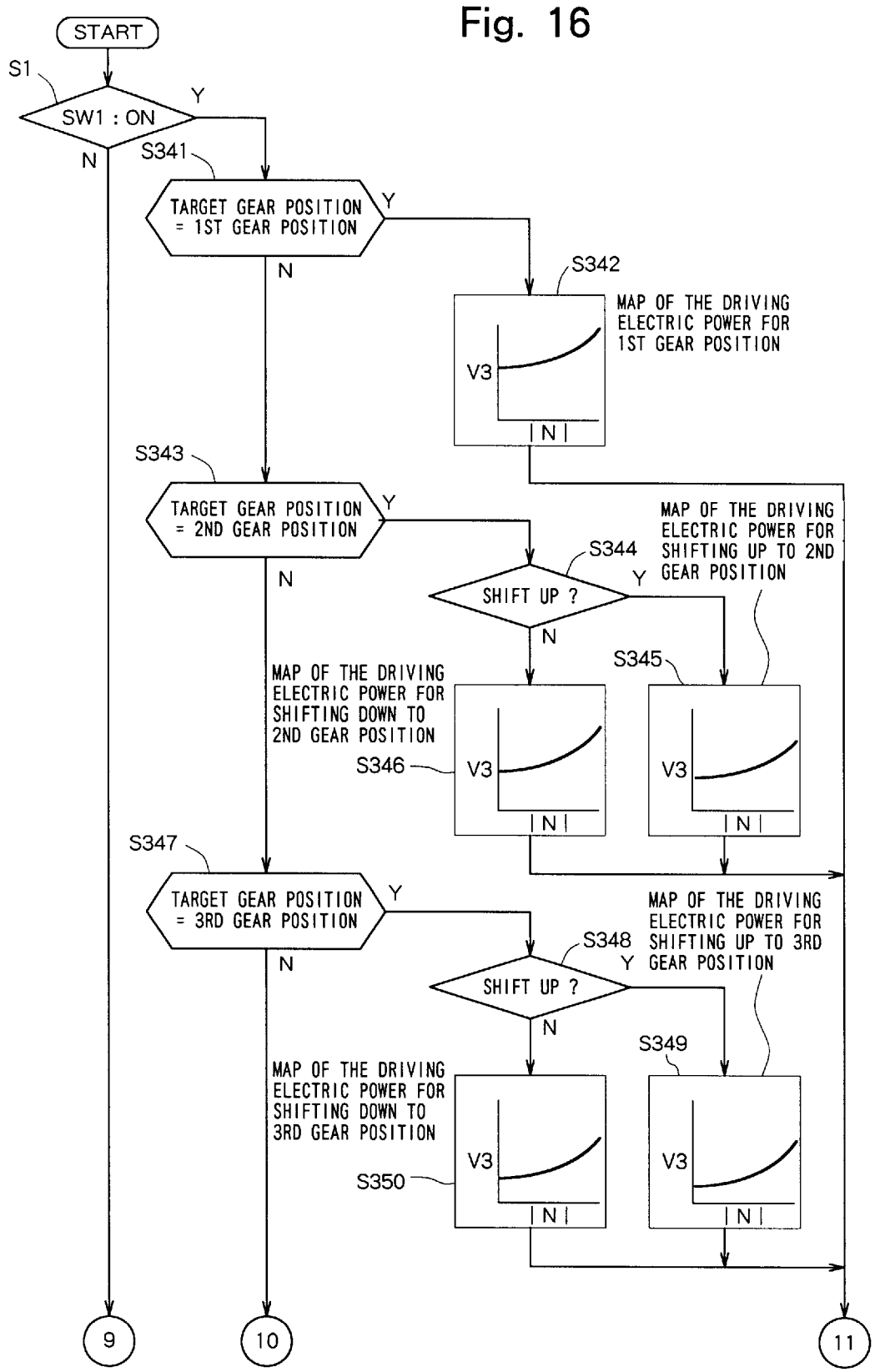
FIGS. 16 and 17 provide a partial flowchart illustrating a procedure of the shift control operation of the controller constituting the shift control device for the transmission constituted according to a fifth embodiment of the present invention.
Figure 17:
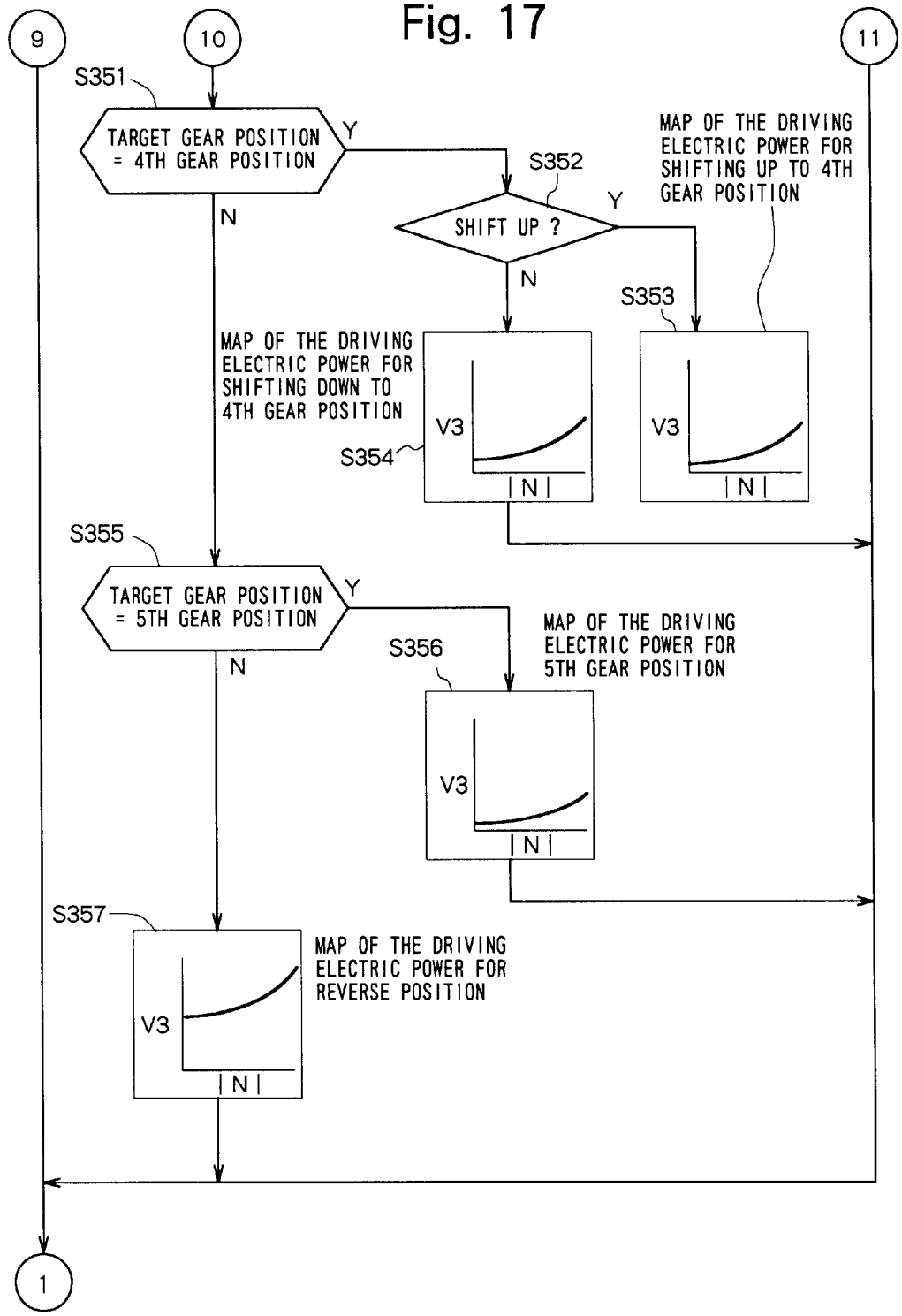

Next, the shift control operation of the controller 10 at the time of changing the speed according to a fifth embodiment will be described with reference to the flowchart shown in FIGS. 16 and 17. The fifth embodiment is a combination of technical idea of the third embodiment shown in FIG. 13 and technical idea of the fourth embodiment shown in FIGS. 14 and 15, and is provided with maps of the driving electric power in the synchronizing range, in which the driving electric power (V3) is set to correspond to the absolute value of the difference (N) in the synchronizing rotational speed for each of the speed change gears, including two kinds of maps of the driving electric power for shift-up and shift-down for the intermediate speed change gears (second gear position, third gear position and fourth gear position in the illustrated embodiment). Namely, the fifth embodiment shown in FIGS. 16 and 17 is equipped with a map of the driving electric power for the first gear position shown at step S342, a map of the driving electric power for shift-up to the second gear position shown at step S345, a map of the driving electric power for shift-down to the second gear position shown at step S346, a map of the driving electric power for shift-up to the third gear position shown at step S349, a map of the driving electric power for shift-down to the third gear position shown at step S350, a map of the driving electric power for shift-up to the fourth gear position shown at step S353, a map of the electric power for shift-down to the fourth gear position shown at step S354, a map of the driving electric power for the fifth gear position shown at step S356, and a map of the driving electric power for the reverse position shown at step S357, the maps of the driving electric power being stored in the read-only memory (ROM) 102 of the controller 10. As for the map of the driving electric power for the first gear position shown at step S342, there exists no shift-up. Therefore, there is only one kind of map of the driving electric power that corresponds to the shift-down. As for the map of the driving electric power for the fifth gear position shown at step S356, further, there exists no shift-down. Therefore, there is only one kind of map of the driving electric power that corresponds to the shift-up. Further, as for the map of the driving electric power for the reverse position shown at step S357, there exists neither shift-up nor shift-down. Therefore, there is only one kind of map of the driving electric power that corresponds to the gear ratio (i).

Described below with reference to the flowchart of FIGS. 16 and 17 is the fifth embodiment having maps of the driving electric power in the synchronizing range, in which the driving electric power (V3) is set to correspond to functions of the absolute value of the difference (N) in the synchronizing rotational speed for each of the speed change gears and two kinds of maps of the driving electric power for shift-up and for shift-down for the intermediate speed change gears (second gear position, third gear position and fourth gear position).

First, like in each of the embodiments described above, the controller 10 checks at step S1 whether the clutch pedal switch 91 (SW1) is turned on, i.e., whether the clutch pedal 9 is depressed to disconnect the clutch. When the clutch pedal switch 91 (SW1) has been turned on at step S1, the controller 10 judges that the driver is willing to change the speed since the clutch has been disconnected, and proceeds to step S341 to check whether the target gear position is the first gear position. The target gear position can be specified based on the speed-change instruction signal from the target gear position instruction means 6. When the target gear position is the first gear position at step S341, the controller 10 proceeds to step S342 to obtain a driving voltage (V3) for the electric motor 41 (M2) of the shift actuator 4 corresponding to a first function of the absolute value of the difference (N) in the synchronizing rotational speed in the synchronizing range during the gear-engaging operation from the map of the driving electric power for the first gear position. Here, the absolute value of the difference (N) in the synchronizing rotational speed can be obtained, as described above, from the signals detected by the input shaft rotational speed sensor 7 (ISS) and the output shaft rotational speed sensor 8 (OSS) and from the gear ratio of the speed change gear (first-speed gear this time) of the target gear position that is to be engaged (|difference (N) in the synchronizing rotational speed|=(input shaft rotational speed/gear ratio)−output shaft rotational speed).

When the target gear position is not the first gear position at step S341, the controller 10 proceeds to step S343 to check whether the target gear position is the second gear position. When the target gear position is the second gear position at step S343, the controller 10 proceeds to step S344 to check whether the to-be-engaged target gear position is for shift-up. Whether it is for shift-up is judged based on the target gear position instructed by the target gear position instruction means 6 and the speed change gear (present gear position) that had been engaged up to now. When the to-be-engaged target gear position is for shift-up at step S344, the controller 10 proceeds to step S345 to obtain the driving voltage (V3) for the electric motor 41 (M2) of the shift actuator 4 that corresponds to a second function of the absolute value of the difference (N) in the synchronizing rotational speed in the synchronizing range during the gear-engaging operation from the map of the driving electric power for shift-up to the second gear position. When it is judged at step S344 that the target gear position is not for shift-up but is for shift-down, the controller proceeds to step S346 to obtain the driving voltage (V3) for the electric motor 41 (M2) of the shift actuator 4 that corresponds to a third function of the absolute value of the difference (N) in the synchronizing rotational speed in the synchronizing range during the gear-engaging operation from the map of the driving electric power for shift-down to the second gear position.

When the target gear position is not the second gear position at step S343, the controller 10 proceeds to step S347 to check whether the target gear position is the third gear position. When the target gear position is the third gear position at step S347, the controller 10 proceeds to step S348 to check whether the target gear position to be engaged is for shift-up. When the target gear position that is to be engaged is for shift-up at step S348, the controller 10 proceeds to step S349 to obtain the driving voltage (V3) for the electric motor 41 (M2) of the shift actuator 4 that corresponds to a fourth function of the absolute value of the difference (N) in the synchronizing rotational speed in the synchronizing range during the gear-engaging operation from the map of the driving electric power for shift-up to the third gear position. When it is judged at step S348 that the target gear position is not for shift-up but is for shift-down, the controller 10 proceeds to step S350 to obtain the driving voltage (V3) for the electric motor 41 (M2) of the shift actuator 4 that corresponds to a fifth function of the absolute value of the difference (N) in the synchronizing rotational speed in the synchronizing range during the gear-engaging operation from the map of the driving electric power for shift-down to the third gear position.

When the target gear position is not the third gear position at step S347, the controller 10 proceeds to step S351 to check whether the target gear position is the fourth gear position. When the target gear position is the fourth gear position at step S351, the controller 10 proceeds to step S352 to check whether the target gear position to be engaged is for shift-up. When the target gear position to be engaged is for shift-up at step S352, the controller 10 proceeds to step S353 to obtain a driving voltage (V3) for the electric motor 41 (M2) of the shift actuator 4 that corresponds to a sixth function of the absolute value of the difference (N) in the synchronizing rotational speed in the synchronizing range during the gear-engaging operation from the map of the driving electric power for shift-up to the fourth gear position. When it is judged at step S352 that the target gear position is not for shift-up but is for shift-down, the controller 10 proceeds to step S354 to obtain a driving voltage (V3) for the electric motor 41 (M2) of the shift actuator 4 that corresponds to a seventh function of the absolute value of the difference (N) in the synchronizing rotational speed in the synchronizing range during the gear-engaging operation from the map of the driving electric power for shift-down to the fourth gear position.

When the target gear position is not the fourth gear position at step S351, the controller 10 proceeds to step S355 to check whether the target gear position is the fifth gear position. When the target gear position is the fifth gear position at step S355, the controller 10 proceeds to step S356 to obtain a driving voltage (V3) for the electric motor 41 (M2) of the shift actuator 4 that corresponds to an eighth function of the absolute value of the difference (N) in the synchronizing rotational speed in the synchronizing range during the gear-engaging operation from the map of the driving electric power for the fifth gear position.

When the target gear position is not the fifth gear position at step S355, the controller 10 judges that the target gear position instructed by the target gear position instruction means 6 is the reverse gear position. The controller 10, then, proceeds to step S357 to obtain a driving voltage (V3) for the electric motor 41 (M2) of the shift actuator 4 that corresponds to a ninth function of the absolute value of the difference (N) in the synchronizing rotational speed in the synchronizing range during the gear-engaging operation from the map of the driving electric power for the reverse gear position.

As described above, the fifth embodiment is provided with maps of the driving electric power in the synchronizing range, in which the driving electric power (V3) is set to correspond to functions of the absolute value of the difference (N) in the synchronizing rotational speed for each of the speed change gears, and with the two kinds of maps of the driving electric power for shift-up and shift-down for the intermediate speed change gears, and the driving voltage (V3) for the electric motor 41 (M2) in the synchronizing range during the gear-engaging operation can be obtained from the appropriate map of the driving electric power based on the difference (N) in the synchronizing rotational speed in the early stage of synchronization and the direction of gear change. In the synchronizing range in the gear-engaging operation to the target gear position, therefore, it is allowed to obtain the operation force of the shift actuator 4 that corresponds to the difference (N) in the synchronizing rotational speed and each of the speed change gears and corresponds to the shift-up or to the shift-down.

As described above, after having executed step S1 through up to step S357 to obtain the driving voltage (V3) for the electric motor 41 (M2) in the synchronizing range during the gear-engaging operation from the map of the driving electric power, which is set for each of the speed change gears and for the direction of speed change, the controller 10 proceeds to step S5 in the first embodiment shown in the flowchart of FIGS. 7 to 9 to execute step S5 through step S27.

Though the invention was described above by way of the illustrated embodiments, it should be noted that the invention is in no way limited thereto only. In the illustrated embodiments, for example, the electric motor was used as the shift actuator. As the shift actuator, however, it is also allowable to use those of any other type, such as an actuator of the hydraulic pressure operation type or an actuator of the solenoid type.

Being constituted as described above, the shift control device for the transmission of the present invention exhibits actions and effects as described below.

That is, the shift control device for the transmission of the present invention determines the driving force of the shift actuator correspondingly to the shift stroke position, determines the difference in the synchronizing rotational speed based on the rotational speed of the input shaft, the gear ratio of the speed change gear that is to be engaged and the rotational speed of the output shaft and determines the driving force of the shift actuator in the synchronizing range in the gear-engaging operation based on the determined difference in the synchronizing rotational speed, making it possible to obtain the operation force that corresponds to a function of the difference in the synchronizing rotational speed. It is therefore made possible to make nearly uniform the speed changing time from when the change of speed is instructed by the target gear position instruction means until when the speed changing operation is finished.

Further, the shift control device for the transmission of the present invention is provided with a map of the driving force in the synchronizing range, in which the driving force is set to correspond to the difference in the synchronizing rotational speed, and determines the driving force of the actuator correspondingly to the shift stroke position, determines the difference in the synchronizing rotational speed based on the rotational speed of the input shaft, gear ratio of a speed change gear that is to be engaged and rotational speed of the output shaft, and determines the driving force in the synchronizing range, that corresponds to the determined difference in the synchronizing rotational speed from the map of the driving force, making it possible to obtain the operation force corresponding to the difference in the synchronizing rotational speed. It is therefore made possible to make nearly uniform the speed changing time from when the change of speed is instructed by the target gear position instruction means until when the speed changing operation is finished.

Further, the shift control device for the transmission of the present invention is provided with a map of the driving force for shift-up in the synchronizing range, in which the driving force at the time of shift-up is set to correspond to a first function of the difference in the synchronizing rotational speed and a map of the driving force for shift-down in the synchronizing range, in which the driving force at the time of shift-down is set to correspond to a second function of the difference in the synchronizing rotational speed, and determines the driving force of the actuator corresponding to the shift stroke position, selects the map of the driving force for shift-up or the map of the driving force for shift-down based on the judgment of the shift-up/shift-down judging means, determines the difference in the synchronizing rotational speed based on the rotational speed of the input shaft, gear ratio of a speed change gear that is to be engaged and rotational speed of the output shaft, and determines the driving force in the synchronizing range, that corresponds to the appropriate function of the determined difference in the synchronizing rotational speed from the selected map of the driving force, making it possible to obtain the operation force that corresponds to the difference in the synchronizing rotational speed and to the shift-up or to the shift-down in the synchronizing range in the gear-engaging operation. It is therefore made possible to make nearly uniform the speed changing time from when the change of speed is instructed by the target gear position instruction means until when the speed changing operation is finished.

Further, the shift control device for the transmission of the present invention is provided with maps of the driving force in the synchronizing range, in which the driving force is set to correspond to functions of the difference in the synchronizing rotational speed for each of the speed change gears in the transmission, and determines the driving force of the actuator correspondingly to the shift stroke position, determines the difference in the synchronizing rotational speed based on the rotational speed of the input shaft, the gear ratio of the speed change gear that is to be engaged and the rotational speed of the output shaft, and determines the driving force in the synchronizing range that corresponds to the appropriate function of the determined difference in the synchronizing rotational speed from the map of the driving force that corresponds to the gear that is to be engaged, making it possible to obtain the operation force corresponding to the difference in the synchronizing rotational speed and to each of the speed change gears in the synchronizing range during the gear-engaging operation. It is therefore made possible to make nearly uniform the speed changing time from when the change of speed is instructed by the target gear position instruction means until when the speed changing operation is finished.

What I claim is:

1. A shift control device for a transmission, the transmission including a synchronizing device, a speed change operation mechanism for changing the speed of the transmission, a select actuator for actuating the speed change operation mechanism in a selecting direction, and a shift actuator for actuating the speed change operation mechanism in a shifting direction, said shift control device for a transmission comprising:

target gear position instruction means for instructing a target gear position of the transmission;

a shift stroke sensor for detecting a shift stroke position of the speed change operation mechanism;

an input shaft rotational speed sensor for detecting the rotational speed of the input shaft of the transmission;

an output shaft rotational speed sensor for detecting the rotational speed of the output shaft of the transmission; and a controller for controlling the select actuator and the shift actuator based on signals from said target gear position instruction means, said shift stroke sensor, said input shaft rotational speed sensor and said output shaft rotational speed sensor; wherein, said controller includes a map of the driving force for shift-up in a synchronizing range in which the driving force at the time of shift-up is set to correspond to the difference in the synchronizing rotational speed, a map of the driving force for shift-down in a synchronizing range in which the driving force at the time of shift-down is set to correspond to the difference in the synchronizing rotational speed, and a shift-up/shift-down judging means for judging whether the target gear position instructed by said target gear position instruction means is for shift-up or is for shift-down, and said controller determines the driving force of the shift actuator that corresponds to the shift stroke position based on signals from said target gear position instruction means, said shift stroke sensor, said input shaft rotational speed sensor and said output shaft rotational speed sensor, selects said map of the driving electric power for shift-up or said map of the driving electric power for shift-down based on the judgment of said shift-up/shift-down judging means, determines the difference in the synchronizing rotational speed based on the input shaft rotational speed, the gear ratio of the target gear position and the output shaft rotational speed, and determines the driving electric power of the shift actuator in the synchronizing range that corresponds to the determined difference in the synchronizing rotational speed from the selected map of the driving force.

2. A shift control device for a transmission according to claim 1, wherein the shift actuator is an electric motor, and wherein said map of the driving force for shift-up and said map of the driving force for shift-down are respectively a map of the driving electric power for shift-up and a map of the driving electric power for shift-down, and said controller determines the driving electric power of the shift actuator in the synchronizing range from said map of the driving electric power for shift-up and from said map of the driving electric power for shift-down.

3. A shift control device for a transmission, the transmission including a synchronizing device, a speed change operation mechanism for changing the speed of the transmission, a select actuator for actuating the speed change operation mechanism in the selecting direction, and a shift actuator for actuating the speed change operation mechanism in the shifting direction, said shift control device for a transmission comprising:

target gear position instruction means for instructing a target gear position of the transmission;

a shift stroke sensor for detecting a shift stroke position of the speed change operation mechanism;

an input shaft rotational speed sensor for detecting the rotational speed of the input shaft of the transmission;

an output shaft rotational speed sensor for detecting the rotational speed of the output shaft of the transmission; and a controller for controlling the select actuator and the shift actuator based on signals from said target gear position instruction means, said shift stroke sensor, said input shaft rotational speed sensor and said output shaft rotational speed sensor; wherein, said controller includes a map of the driving force in a range in which a driving force is set to correspond to the difference in the synchronizing rotational speed for each of the gear positions of the transmission, and said controller determines the driving force of the shift actuator that corresponds to the shift stroke position based on the signals from said target gear position instruction means, said shift stroke sensor, said input shaft rotational speed sensor and said output shaft rotational speed sensor, determines the difference in the synchronizing rotational speed based on the input shaft rotational speed, the gear ratio of the target gear position and the output shaft rotational speed, and determines the driving force of the shift actuator in the synchronizing range that corresponds to the determined difference in the synchronizing rotational speed from the map of the driving force corresponding to the target gear position.

4. A shift control device for a transmission according to claim 3, wherein:

said map of the driving force includes a map of the driving force for shift-up and a map of the driving force for shift-down for the intermediate speed change gears; and said controller is provided with a shift-up/shift-down judging means for judging whether a target gear position that is instructed by said target gear position instruction means is to be shifted-up or shifted-down, and selects said map of the driving force for shift-up or said map of the driving force for shiftdown based on the judgment of said shift-up/shift-down judging means when the target gear position is an intermediate gear, determines the difference in the synchronizing rotational speed based on the input shaft rotational speed, the gear ratio of the target gear position and the output shaft rotational speed, and determines the driving force of the shift actuator in the synchronizing range that corresponds to the determined difference in the synchronizing rotational speed from the selected map of the driving force.

5. A shift control device for a transmission according to claim 3, wherein the shift actuator is an electric motor, and wherein said map of the driving force is a map of the driving electric power, and said controller determines the driving electric power of the shift actuator in the synchronizing range from said map of the driving electric power.

* * * * *